US012236795B2

(12) United States Patent
Gariel et al.

(10) Patent No.: US 12,236,795 B2
(45) Date of Patent: Feb. 25, 2025

(54) AUTONOMOUS PATH PLANNING

(71) Applicant: Joby Aero, Inc., Santa Cruz, CA (US)

(72) Inventors: Maxime Marie Christophe Gariel, San Francisco, CA (US); Marc Alain Lecerf, San Mateo, CA (US); Evan Michael Wilson, San Francisco, CA (US); Allen David Wu, Dublin, CA (US); Anne-Claire Le Bihan, San Mateo, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 201 days.

(21) Appl. No.: 17/687,981

(22) Filed: Mar. 7, 2022

(65) Prior Publication Data

US 2022/0189325 A1 Jun. 16, 2022

Related U.S. Application Data

(63) Continuation of application No. 16/598,383, filed on Oct. 10, 2019, now Pat. No. 11,270,596.
(Continued)

(51) Int. Cl.
*G08G 5/02* (2006.01)
*G01C 21/20* (2006.01)
(Continued)

(52) U.S. Cl.
CPC ............ *G08G 5/025* (2013.01); *G01C 21/20* (2013.01); *G05D 1/0088* (2013.01); *G05D 1/101* (2013.01);
(Continued)

(58) Field of Classification Search
CPC .... G08G 5/025; G08G 5/0026; G08G 5/0043; G01C 21/20; G05D 1/0088; G05D 1/101; G06N 5/01
See application file for complete search history.

(56) References Cited

U.S. PATENT DOCUMENTS 8,428,794 B2 * 4/2013 Peterson ................ G08G 5/025
701/16
9,188,978 B2 * 11/2015 Sacle ..................... G08G 5/003
(Continued)

*Primary Examiner* — Hunter B Lonsberry
*Assistant Examiner* — Harrison Heflin
(74) *Attorney, Agent, or Firm* — Dority & Manning, P.A.

(57) ABSTRACT

A method includes selecting a landing waypoint on a runway and selecting a starting waypoint based on a location/heading of an aircraft relative to the runway. The method includes selecting additional waypoints between the starting waypoint and the landing waypoint. The starting and additional waypoints include latitude, longitude, and altitude variables. A sequence of waypoints from the starting waypoint to the landing waypoint via the additional waypoints indicates a desired location for the aircraft to traverse. The method includes generating location constraints for the starting and additional waypoints and generating an objective function for optimizing at least one of the variables. Additionally, the method includes generating a solution for the objective function subject to the location constraints. The solution includes latitude, longitude, and altitude values for the variables. The method further includes controlling the aircraft to traverse the starting and additional waypoints according to the latitude, longitude, and altitude values.

26 Claims, 20 Drawing Sheets

Related U.S. Application Data

(60) Provisional application No. 62/744,426, filed on Oct. 11, 2018.

(51) Int. Cl.
 G05D 1/00 (2024.01)
 G06N 5/01 (2023.01)
 G08G 5/00 (2006.01)

(52) U.S. Cl.
 CPC .............. G06N 5/01 (2023.01); G08G 5/0026 (2013.01); G08G 5/0043 (2013.01)

(56) References Cited

U.S. PATENT DOCUMENTS

| | | | |
|---|---|---|---|
| 9,443,433 B1 * | 9/2016 | Conway | G08G 5/0026 |
| 2016/0086497 A1 * | 3/2016 | Williams | G08G 5/0069 |
| | | | 701/16 |
| 2017/0032687 A1 * | 2/2017 | Lamkin | G08G 5/0082 |
| 2019/0088143 A1 * | 3/2019 | Deker | G05D 1/0202 |
| 2019/0213891 A1 * | 7/2019 | Snyder | G08G 5/0013 |

\* cited by examiner

AUTONOMOUS PATH PLANNING

CROSS-REFERENCE TO RELATED APPLICATIONS

This application claims the benefit of U.S. Provisional Application No. 62/744,426, filed on Oct. 11, 2018, and is a continuation of U.S. application Ser. No. 16/598,383, filed on Oct. 10, 2019. The disclosures of the above-identified applications are incorporated herein by reference in their entirety.

FIELD

The present disclosure relates to path planning for aircraft.

BACKGROUND

Air traffic (i.e., movement of aircraft) around airports may be orchestrated by air traffic control at controlled airports or left to aircraft pilots at uncontrolled airports. At controlled airports, air traffic controllers may ensure safe and efficient movement of aircraft by providing some limited guidance to pilots while expecting pilots to abide by a set of explicit and/or implicit rules. Example explicit rules may include rules in the Federal Aviation Administration (FAA) Aeronautical Instruction Manual (AIM). Example implicit rules may include those rules that are acquired via pilot training. In the case of uncontrolled airports, in Visual Flight Rules (VFR) conditions, pilots may rely on the above mentioned rules and on their skills to maintain safe separation between aircraft and to maintain a behavior that is predictable by other pilots in the same area.

SUMMARY

In one example, a system comprises a runway selector module, a leg sequencer module, and a pattern planner module. The runway selector module is configured to select a landing waypoint on a runway. The leg sequencer module is configured to select a starting waypoint based on a location of an aircraft relative to the runway and a heading of the aircraft relative to the runway and select additional waypoints between the starting waypoint and the landing waypoint. The starting waypoint and the additional waypoints each include a latitude variable, a longitude variable, and an altitude variable. A sequence of waypoints from the starting waypoint to the landing waypoint via the additional waypoints indicates a desired location for the aircraft to traverse prior to landing on the runway at the landing waypoint. The pattern planner module is configured to generate one or more location constraints for the starting waypoint and each of the additional waypoints, generate an objective function for optimizing at least one of the variables associated with the starting waypoint and the additional waypoints, and generate a solution for the objective function subject to the location constraints. The solution includes latitude values, longitude values, and altitude values for each of the latitude variables, longitude variables, and altitude variables associated with the starting waypoint and the additional waypoints. The pattern planner module is configured to output a landing pattern to a flight control system. The landing pattern includes the starting waypoint, the additional waypoints, the landing waypoint, and the corresponding latitude values, longitude values, and altitude values.

In another example, a method comprises selecting a landing waypoint on a runway and selecting a starting waypoint based on a location of an aircraft relative to the runway and a heading of the aircraft relative to the runway. The method comprises selecting additional waypoints between the starting waypoint and the landing waypoint. The starting waypoint and the additional waypoints each include a latitude variable, a longitude variable, and an altitude variable. A sequence of waypoints from the starting waypoint to the landing waypoint via the additional waypoints indicates a desired location for the aircraft to traverse prior to landing on the runway at the landing waypoint. The method comprises generating one or more location constraints for the starting waypoint and each of the additional waypoints and generating an objective function for optimizing at least one of the variables associated with the starting waypoint and the additional waypoints. Additionally, the method comprises generating a solution for the objective function subject to the location constraints. The solution includes latitude values, longitude values, and altitude values for each of the latitude variables, longitude variables, and altitude variables associated with the starting waypoint and the additional waypoints. The method further comprises controlling the aircraft to follow a landing pattern that traverses the starting waypoint and the additional waypoints according to the latitude values, longitude values, and altitude values.

In another example, a non-transitory computer-readable medium comprises computer-executable instructions. The computer-executable instructions cause a processing unit to select a landing waypoint on a runway and select a starting waypoint based on a location of an aircraft relative to the runway and a heading of the aircraft relative to the runway. The computer-executable instructions further cause the processing unit to select additional waypoints between the starting waypoint and the landing waypoint. The starting waypoint and the additional waypoints each include a latitude variable, a longitude variable, and an altitude variable. A sequence of waypoints from the starting waypoint to the landing waypoint via the additional waypoints indicates a desired location for the aircraft to traverse prior to landing on the runway at the landing waypoint. The computer-executable instructions further cause the processing unit to generate one or more location constraints for the starting waypoint and each of the additional waypoints and generate an objective function for optimizing at least one of the variables associated with the starting waypoint and the additional waypoints. The computer-executable instructions further cause the processing unit to generate a solution for the objective function subject to the location constraints. The solution includes latitude values, longitude values, and altitude values for each of the latitude variables, longitude variables, and altitude variables associated with the starting waypoint and the additional waypoints. The computer-executable instructions further cause the processing unit to control the aircraft to follow a landing pattern that traverses the starting waypoint and the additional waypoints according to the latitude values, longitude values, and altitude values.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

An automatic flight management system 600 (AFMS 600) of the present disclosure generates one or more flight pattern data structures that an aircraft may use to navigate in the vicinity of an airport. A flight pattern data structure may include a sequence of waypoints that each indicate a target location for the aircraft over time. A waypoint may indicate a three-dimensional location in space, such as a latitude, longitude, and altitude (e.g., in meters). Each of the waypoints in the flight pattern data structure may also be associated with additional waypoint data, such as a waypoint time (e.g., a target time of arrival at the waypoint) and/or a waypoint speed (e.g., a target airspeed in knots or kilometers per hour). An aircraft autopilot, aircraft pilot, and/or remote operator may control an aircraft according to the generated flight pattern data structure.

Figure 12A:
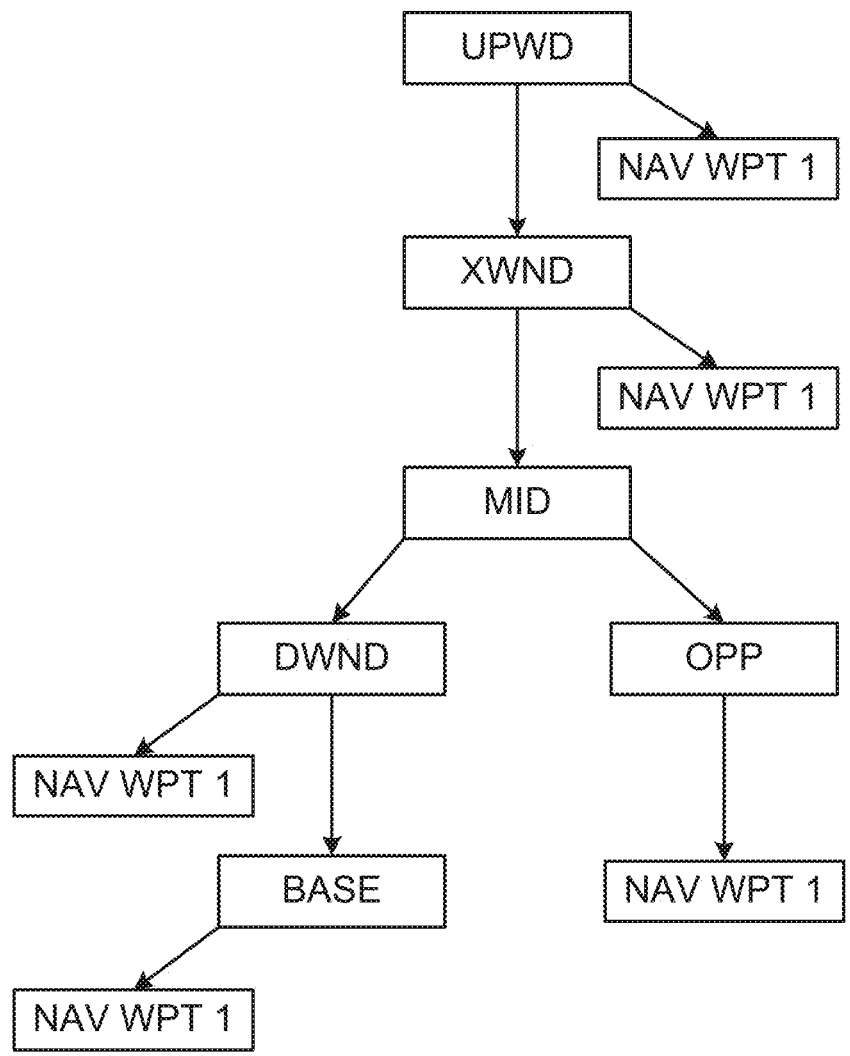
FIG. 12A illustrates an example waypoint sequence data structure for generating a takeoff pattern.

In some implementations, a flight pattern data structure may be used to land an aircraft. In these implementations, the flight pattern data structure may be referred to as a "landing pattern data structure" (e.g., see FIGS. 3A-4B). In some implementations, a flight pattern data structure may be used by an aircraft to take off from a runway. In these implementations, the flight pattern data structure may be referred to as a "takeoff pattern data structure" or a "departure pattern data structure" (e.g., see FIGS. 12A-12B). In other implementations, the AFMS 600 of the present disclosure may generate other flight pattern data structures, such as flight pattern data structures for navigating en route to a destination (e.g., an en route flight pattern) and/or flight pattern data structures for holding the aircraft in a defined space (e.g., a holding pattern data structure).

The AFMS 600 may automatically select an airport/runway for landing and determine a sequence of waypoints for the landing pattern data structure with respect to the selected runway. In some implementations, the AFMS 600 may generate a set of constraints for each of the waypoints, such as location constraints, timing constraints, speed constraints, and/or performance feasibility constraints. The AFMS 600 may then determine parameters (e.g., location, time, speed) for the waypoints by generating and solving an objective function subject to the defined constraints.

The AFMS 600 may acquire a variety of types of data for use in generating a flight pattern data structure. Example data may include, but is not limited to, sensor data (e.g., vision-based data and radar data), navigation data (e.g., GNSS data and AHRS data), static data from databases (e.g., an obstacle database and/or terrain database), broadcasted data (e.g., weather forecasts and notices to airmen), and manually acquired data (e.g., pilot vision, radio communications, and air traffic control inputs). Additionally, the AFMS 600 may detect, track, and classify surrounding traffic as well as predict their behavior.

In some implementations, a pilot may use the generated flight pattern to navigate in the vicinity of an airport. For example, the flight pattern associated with the flight pattern data structure may be displayed to the pilot on a display for use in navigation. In some implementations, the aircraft may automatically navigate based on the generated flight pattern data structure. For example, a flight control system (e.g., an autopilot) may control the aircraft according to the landing pattern data structure to land the aircraft.

The flight pattern data structure may mimic a human-generated flight path in the vicinity of controlled and uncontrolled airports. For example, the generated flight pattern may abide by the same set of rules that govern manned air traffic around an airport. The generated flight pattern may also follow the expectations of air traffic controllers and other pilots, while providing flexibility for the aircraft to make decisions and avoid obstacles, weather, and other traffic. The generated flight pattern may also allow an aircraft to adjust speed to meet required times of arrival at waypoints along the way. Additionally, the techniques described herein may improve autonomous and semi-autonomous aircraft trajectory calculations and improve airports' ability to integrate autonomous, semiautonomous, and non-autonomous aircraft, which may provide for increased airport capacity.

The figures and description reference X, Y, and Z coordinates. The X, Y, and Z coordinates may refer to locations relative to the runway. They may be independent of the global coordinates of the runway and may be converted to global latitude, longitude, and altitude using the runway latitude, longitude, altitude, and direction. As such, the calculations herein may be performed in a frame of reference relative to the runway. In some implementations, the X, Y, and Z coordinates relative to the runway may be in terms of distance (e.g., meters), angles (e.g., degrees), or other values that describe the location of the coordinates relative to the runway. The global latitude and longitude may be in terms of degrees (e.g., decimal degrees) or radians, for example. Note that the relative orientations of the compass, runway, and traffic patterns illustrated in the figures are an example set of orientations that are used for description purposes only.

Figure 1:
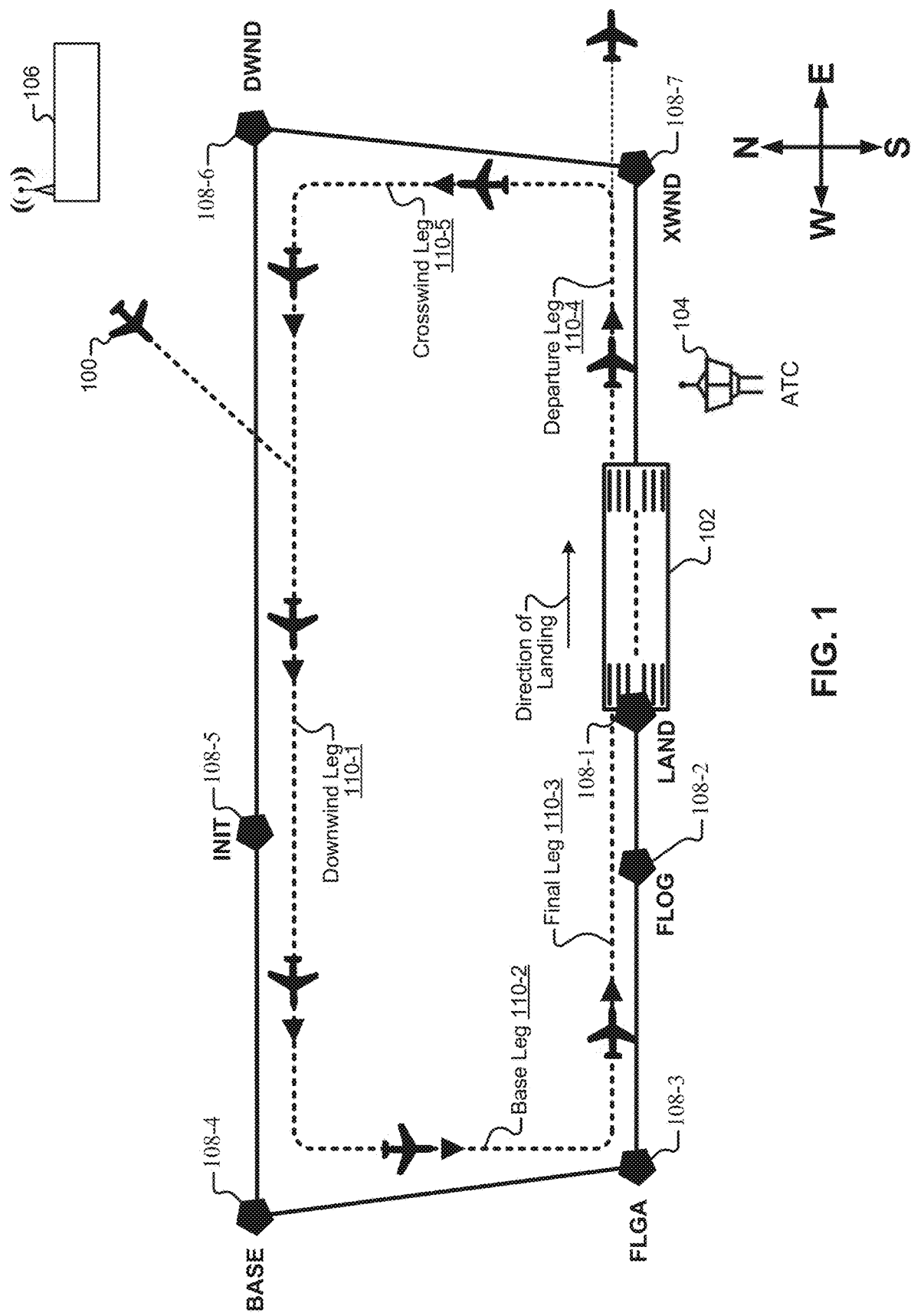
FIG. 1 illustrates example waypoints that may be included in a flight pattern data structure of the present disclosure.

FIG. 1 illustrates a fixed-wing aircraft 100 approaching in a box pattern and landing on runway 102. The fixed-wing aircraft 100 may be in communication with air traffic control 104 (ATC 104) and/or an aircraft operations center 106. Although the disclosure illustrates a fixed-wing aircraft 100, the AFMS 600 of the present disclosure may be used by other types of aircraft with other types of approach patterns and other touchdown areas. For example, other aircraft may include, but are not limited to, rotorcraft, vertical takeoff and landing aircraft (VTOL), and hybrid configurations, such as tilt-wing aircraft, and electrical vertical takeoff and landing aircraft (eVTOL). Other touchdown areas may include, but are not limited to, a heliport, a vertiport, a seaport, and unprepared landing areas, such as emergency landing sites and package delivery sites. In some implementations, the AFMS 600 may generate a flight pattern data structure for a moving touchdown area, such as an aircraft carrier. For example, the equations described herein may be made relative to the moving touchdown area.

FIGS. 1-4B illustrate example waypoints 108-1, 108-2, ..., 108-8 (collectively "waypoints 108") that may be included in a landing pattern data structure. The waypoints 108 are overlaid onto an example traffic pattern around an airport runway 102. The traffic pattern in proximity to the runway 102 may include a downwind leg 110-1, a base leg 110-2, a final leg 110-3, a departure leg 110-4, and a crosswind leg 110-5.

The downwind leg 110-1 may refer to a flight path parallel to the landing runway 102 in the opposite direction of landing. The base leg 110-2 may refer to a flight path at approximately a right angle to the landing runway off the runway's approach end and extending from the downwind leg 110-1 to the intersection of the extended runway centerline. The final leg 110-3 may refer to a flight path in the direction of landing along the extended runway centerline from the base leg 110-2 to the runway 102. The departure leg 110-4 may refer to a flight path that begins after takeoff and continues straight ahead along the extended runway centerline. The departure climb may continue until reaching a point beyond the departure end of the runway 102 (e.g., ½ mile) and within a distance of the traffic pattern altitude (e.g., 300 ft). The crosswind leg 110-5 may refer to a flight path at approximately a right angle to the runway off the runway's takeoff end. An upwind leg (not illustrated) may refer to a flight path parallel to the landing runway 102 in the direction of landing.

The flight pattern data structure includes a sequence of waypoints 108 that define a target flight path for the aircraft 100. The pentagons represent waypoints 108 that the aircraft 100 may fly through/by in a sequence. In some examples, a fly-through waypoint may refer to a waypoint that the aircraft should reach before turning. In some examples, a fly-by waypoint may refer to a waypoint for which the aircraft should initiate the turn before reaching the waypoint (e.g., "cutting" the corner). The figures herein represent a two dimensional version of the flight path, although an altitude may be associated with each waypoint. As illustrated in FIG. 1, a landing pattern data structure may include a plurality of waypoints that define a flight path that terminates at a landing waypoint 108-1 (LAND 108-1) on the runway 102. In some cases, a landing pattern data structure may define a sequence of waypoints around the runway 102 that define a quadrilateral shape (e.g., a rectangle or trapezoid) that includes the runway 102 along a leg of the quadrilateral shape.

Figure 2:
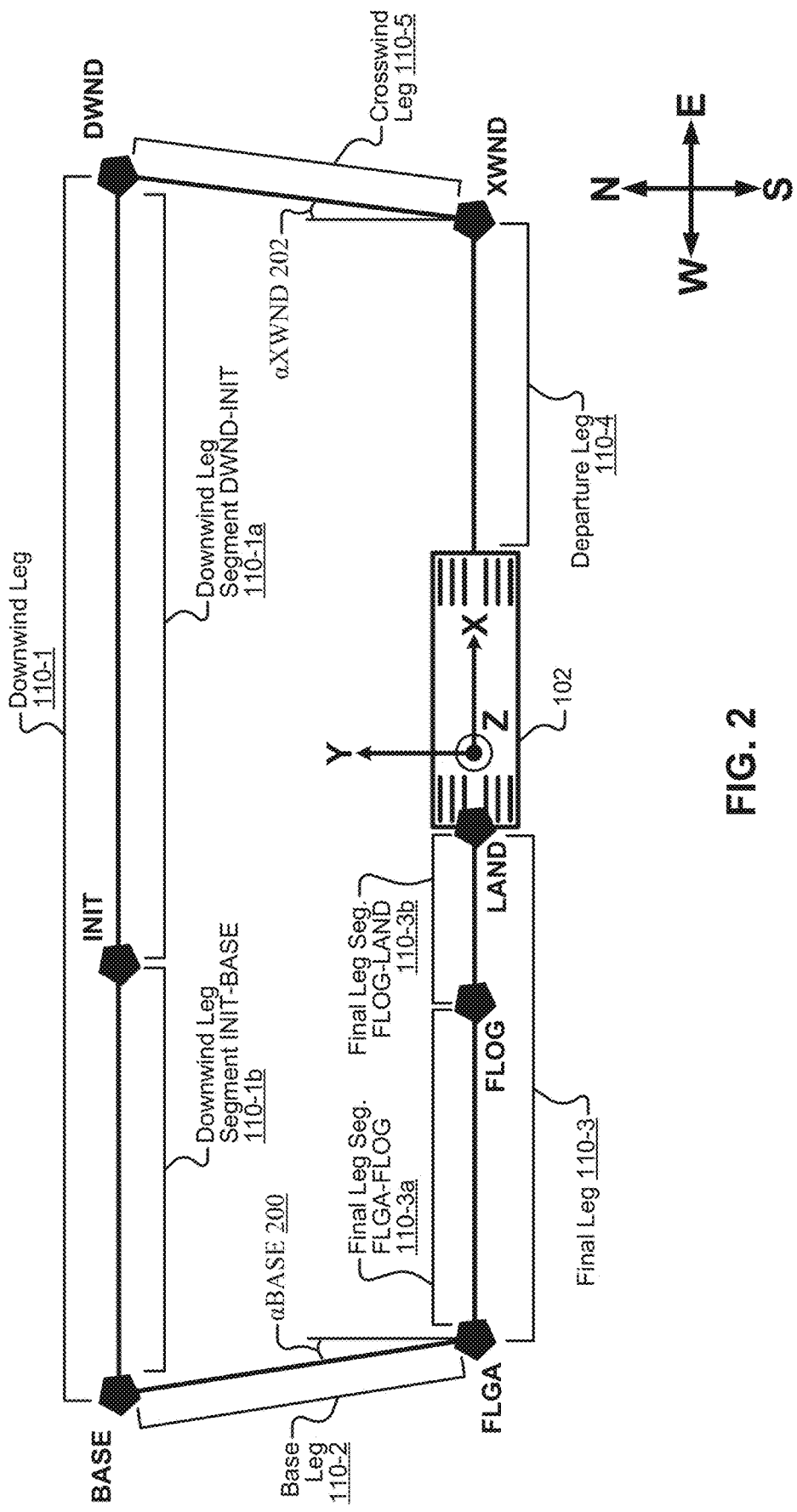
FIG. 2 illustrates waypoints and flight pattern legs that may be included in a flight pattern data structure.

A flight pattern data structure may be generated from a plurality of selectable waypoints 108. The waypoint names may be representative of the beginning of the leg. As illustrated in FIGS. 1-2, example selectable waypoints may include, but are not limited to, a downwind waypoint 108-6 (DWND 108-6), an initial descent waypoint 108-5 (INIT 108-5), a base waypoint 108-4 (BASE 108-4), a final landing glideslope acquired waypoint 108-3 (FLGA 108-3), a final leg on glideslope waypoint 108-2 (FLOG 108-2), a landing waypoint 108-1 (LAND 108-1), and a crosswind waypoint 108-7 (XWND 108-7). The AFMS 600 may generate flight pattern data structures including different numbers of waypoints described herein. For example, the AFMS 600 can generate a landing pattern data structure including a subset of the waypoints 108 illustrated in FIGS. 1-2 (e.g., see FIGS. 3A-4B).

The waypoints illustrated in FIGS. 1-2 define a plurality of legs, which may be referred to as "flight pattern legs" or "pattern legs." The pattern legs may extend from one waypoint to another. The pattern legs may form a flight pattern shape. A flight pattern shape that includes the waypoints 108 of FIGS. 1-2 may be a quadrilateral shape (e.g., a trapezoidal shape) that includes the runway 102 along one of the legs. The waypoints 108 may define the vertices of the quadrilateral flight pattern in some cases. In some implementations, the flight pattern data structure may include waypoints that define target locations along the pattern legs (e.g., an INIT waypoint 108-5). The target locations along the pattern legs (e.g., INIT 108-5 or FLOG 108-2) may define "pattern leg segments." For example, in some implementations, the final leg 110-3 may include two leg segments 110-3a, 110-3b divided by the FLOG waypoint 108-2.

The waypoints illustrated in FIGS. 1-4B are described as being included in a landing pattern. Referring to FIGS. 1-2, the DWND waypoint 108-6 may be the start of the downwind leg 110-1 of the landing pattern (e.g., see FIG. 3A). The downwind leg 110-1 may extend to the BASE waypoint 108-4. In some implementations, the downwind leg 110-1 may include two leg segments 110-1a, 110-1b divided by the INIT waypoint 108-5. In some cases, the aircraft may be flying level upon reaching the DWND waypoint 108-6. During the downwind leg 110-1, the aircraft may be flying parallel to the runway 102. In some implementations, the DWND waypoint 108-6 can be located anywhere from the X coordinate of the LAND waypoint 108-1 (0, 0, 0) to a position in the positive X direction (e.g., east of the runway 102).

At some point on the downwind leg 110-1 (e.g., the INIT waypoint 108-5), the aircraft 100 may begin an initial descent. The INIT waypoint 108-5 may be a point of transition from level flight to final landing. For example, the INIT waypoint 108-5 may provide for an initial descent such that the aircraft reaches the BASE waypoint 108-4 with a proper altitude and airspeed.

An example set of aircraft procedures according to an example landing pattern is now described with respect to the waypoints of FIGS. 1-3C. The example landing pattern assumes the aircraft joins the landing pattern at the DWND waypoint 108-6 and flies parallel to the runway (e.g., at a level flight altitude). At the INIT waypoint 108-5, the aircraft 100 may decelerate, start deploying flaps, landing gears, and descending. At the BASE waypoint 108-4, the aircraft 100 may turn left towards the runway 102 (e.g., at approximately 90 degrees in some cases). In some implementations, the aircraft 100 may decelerate, deploy flaps, and/or descend. At the FLGA waypoint 108-3, the aircraft 100 may turn left to align with the centerline of the runway 102. The aircraft 100 may also correct altitude and descent rate to be on the glideslope. The glideslope may refer to the proper path of descent for an aircraft preparing to land (e.g., approximately a 3-degree line from the runway 102). If the aircraft 100 is below the glideslope, the aircraft 100 may maintain altitude (e.g., not climb) until reaching the glideslope. At the FLOG waypoint 108-2, the aircraft 100 may track the glideslope until landing, maintain airspeed, and further deploy flaps. The aircraft 100 may land at the LAND waypoint 108-1.

In some implementations, the flight pattern data structure may use the XWND waypoint 108-7 as a starting waypoint for the flight pattern data structure. For example, the AFMS 600 may use the XWND waypoint 108-7 as a starting waypoint in a landing pattern. As another example, the AFMS 600 may use the XWND waypoint 108-7 as a starting waypoint for a takeoff pattern where the aircraft flies towards the XWND waypoint 108-7, turns approximately 90 degrees, and then flies towards the DWND waypoint 108-6. In some implementations, the XWND waypoint 108-7 may be used as a starting waypoint after an aborted landing. For example, in response to an aborted landing, the AFMS 600 may generate a new landing pattern that includes the XWND waypoint 108-7 as the starting waypoint.

Referring to FIG. 2, in some implementations, the location of the waypoints relative to one another may be defined by angles, such as angles relative to the extended runway centerline. For example, the location of the BASE waypoint 108-4 relative to the FLGA waypoint 108-3 may be defined by a base angle 200 (αBASE). αBASE 200 may be defined by the angle formed by the extended runway centerline and the base leg 110-2. For example, αBASE 200 in FIG. 2 is the amount by which the angle between the base leg 102 and the extended runway centerline is greater than 90 degrees. As another example, the location of the DWND waypoint 108-6 relative to the XWND waypoint 108-7 may be defined by a crosswind angle 202 (αXWND). αXWND 202 may be defined by the angle formed by the extended runway centerline and the crosswind leg 110-5. For example, αXWND 202 in FIG. 2 is the amount by which the angle between the crosswind leg 110-5 and the extended runway centerline is greater than 90 degrees. In some implementations, the BASE waypoint 108-4 and/or the DWND waypoint 108-6 may be arranged such that the obtuse angles including αBASE and αXWND of FIG. 2 may be acute angles. In these implementations, the flight pattern may have a different shape than illustrated in FIG. 2, such as a trapezoid having different side lengths and angles than illustrated in FIG. 2.

The waypoints 108 illustrated in FIGS. 1-2 may be a selectable set of waypoints that the AFMS 600 may select to be included in a flight pattern (e.g., a landing pattern). The AFMS 600 may generate a flight pattern by selecting a subset of the waypoints 108. The subset of waypoints used in a flight pattern may be referred to as a selected set of waypoints. The selected set of waypoints for a landing pattern may define a flight path along a portion of the quadrilateral defined by the selectable set of waypoints.

The AFMS 600 may select a subset of the selectable waypoints for the landing pattern. Initially, the AFMS 600 may select a starting waypoint for the landing pattern. The AFMS 600 may then select subsequent waypoints (i.e., additional waypoints) for the landing pattern up to the LAND waypoint 108-1. The AFMS 600 may select the starting waypoint for the landing pattern based on a set of starting waypoint selection criteria. The starting waypoint selection criteria may include, but are not limited to, aircraft location (e.g., aircraft latitude/longitude coordinates), aircraft bearing, aircraft speed, aircraft altitude, and the behavior of other aircraft in the vicinity. For example, the AFMS 600 may select a starting waypoint based on the location of the aircraft relative to the runway (e.g., the LAND waypoint 108-1). As another example, the AFMS 600 may select the starting waypoint based on the current heading of the aircraft relative to the runway 102 (e.g., the LAND waypoint 108-1) and/or the runway direction. Example starting waypoint selection criteria are graphically illustrated and described with respect to FIG. 10C.

Figure 5:
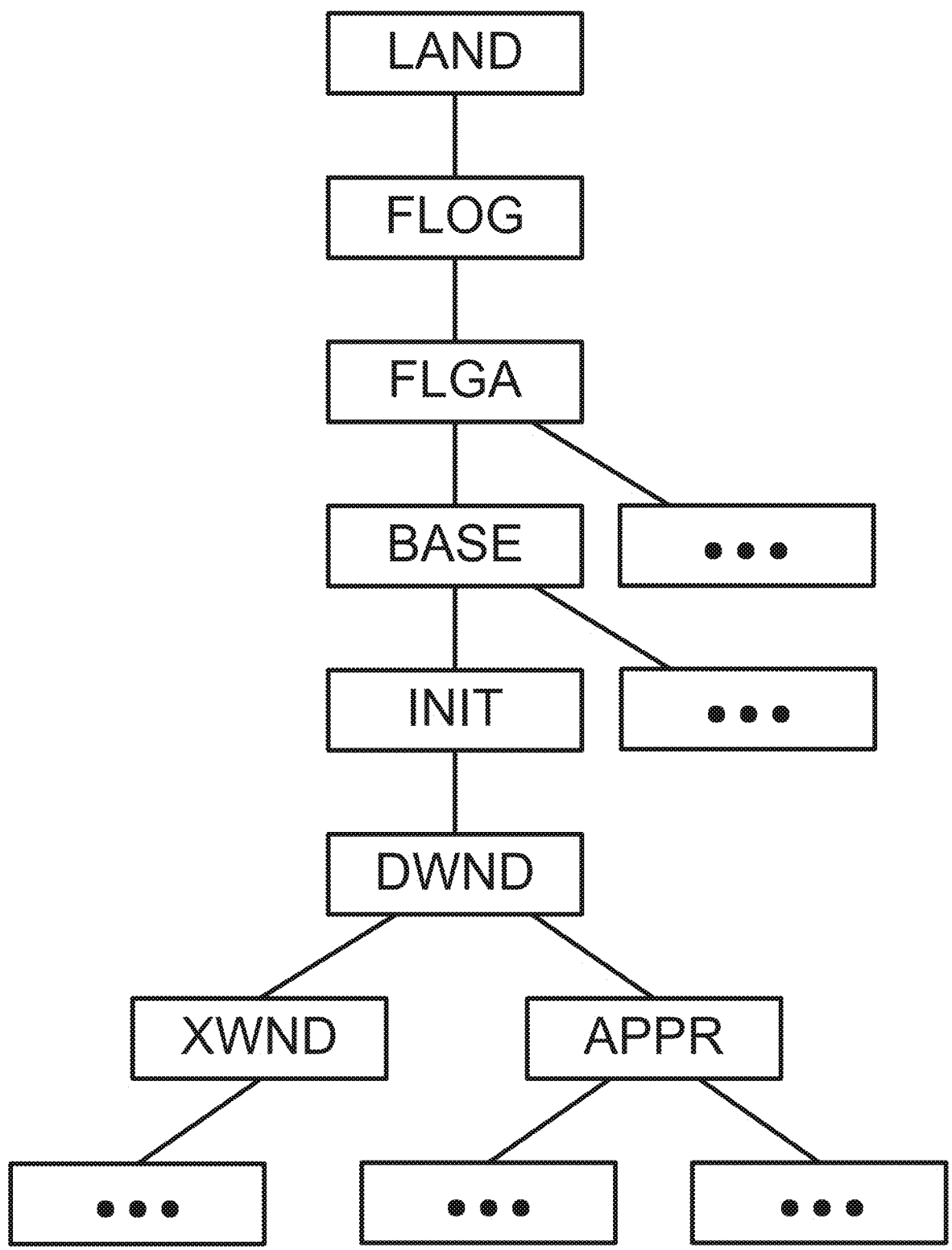
FIG. 5 illustrates an example waypoint sequence data structure for generating a landing pattern.

After selecting the starting waypoint, the AFMS 600 may use a waypoint sequence data structure (e.g., see FIG. 5) to determine the sequence of waypoints to the LAND waypoint 108-1. The waypoint sequence data structure may be a tree data structure, as illustrated in FIG. 5. In this example, the LAND waypoint 108-1 may be the root node of the tree data structure. Furthermore, the child nodes may include the additional selectable waypoints, some of which may be used as starting waypoints. To use the waypoint sequence data structure, the AFMS 600 may initially identify the starting waypoint (e.g., as a leaf in the tree) and then select the waypoints leading to the LAND waypoint 108-1. The nodes of the tree (e.g., leaves of the tree) including ellipses may represent aircraft entry points into the starting waypoints. In some implementations, the nodes including ellipses may also represent additional waypoints that the AFMS 600 may generate, such as waypoints outside of the flight patterns illustrated herein.

Figure 3A:
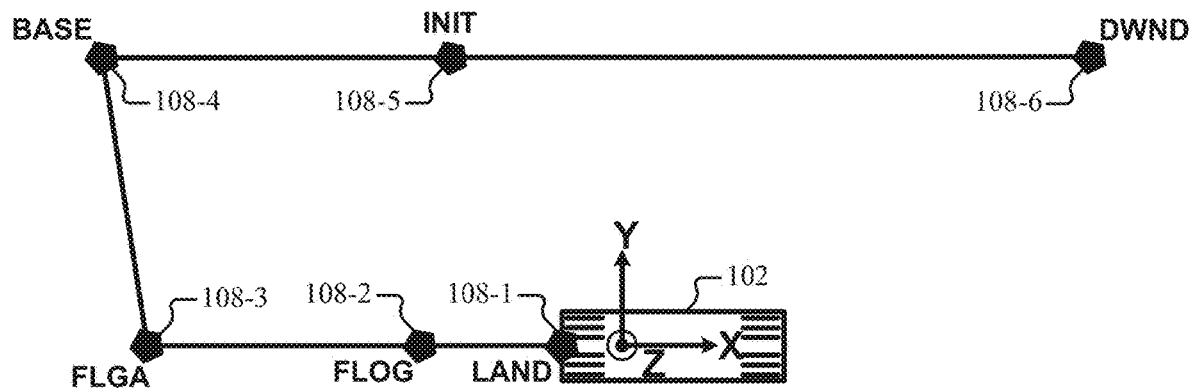
FIGS. 3A-3C illustrate example landing patterns.
Figure 3B:
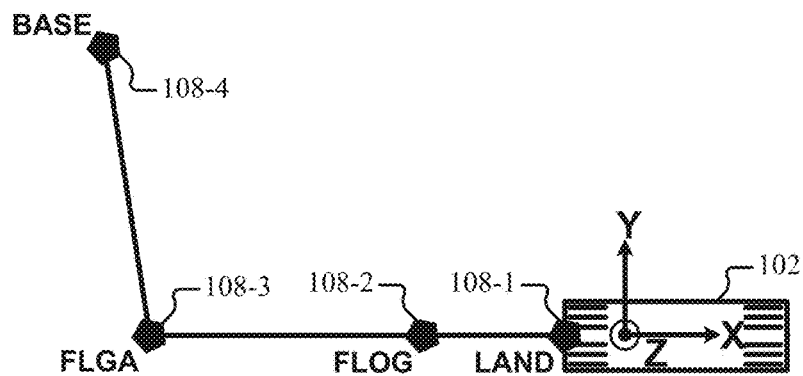
Figure 3C:
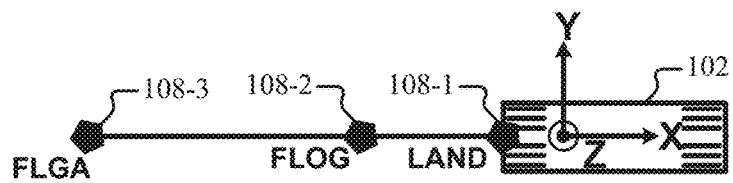

FIGS. 3A-3C illustrate example subsets of waypoints that the AFMS 600 may select for a landing pattern. In FIG. 3A, the AFMS 600 selects the DWND waypoint 108-6 as the starting waypoint. In some implementations, the AFMS 600 may select the DWND waypoint 108-6 when the aircraft is approaching the runway from positive X/XY direction (e.g., the east/northeast direction) (e.g., see FIG. 10C). The AFMS 600 may then use the waypoint sequence data structure to select the subsequent waypoints as INIT, BASE, FLGA, FLOG, and LAND.

In FIG. 3B, the AFMS 600 selects the BASE waypoint 108-4 as the starting waypoint. In some implementations, the AFMS 600 may select the BASE waypoint 108-4 when the aircraft is approaching the runway from the negative X, positive Y direction (e.g., the northwest direction) (e.g., see FIG. 10C). The AFMS 600 may then use the waypoint sequence data structure to select the subsequent waypoints as FLGA, FLOG, and LAND.

In FIG. 3C, the AFMS 600 selects the FLGA waypoint 108-3 as the starting waypoint. In some implementations, the AFMS 600 may select the FLGA waypoint 108-3 when the aircraft is approaching the runway from the negative X direction (e.g., from the west) with a heading toward the runway in the landing direction (e.g., see FIG. 10C). The AFMS 600 may then use the waypoint sequence data structure to select the subsequent waypoints as FLOG and LAND.

In some implementations, the AFMS 600 can select the full set of waypoints 108 illustrated in FIGS. 1-2. For example, in the case the aircraft 100 approaches the runway 102 from the X/-Y direction (e.g., the southeast), the AFMS 600 may select the XWND waypoint 108-7 as the starting waypoint. In another example, the AFMS 600 may select the XWND waypoint 108-7 as the starting waypoint if the aircraft 100 aborts a landing. In another example, the AFMS 600 may select the XWND waypoint 108-7 as the starting waypoint if the aircraft takes off from the same runway and comes back for a landing (e.g., a traffic pattern as executed by student pilots).

Figure 4A:
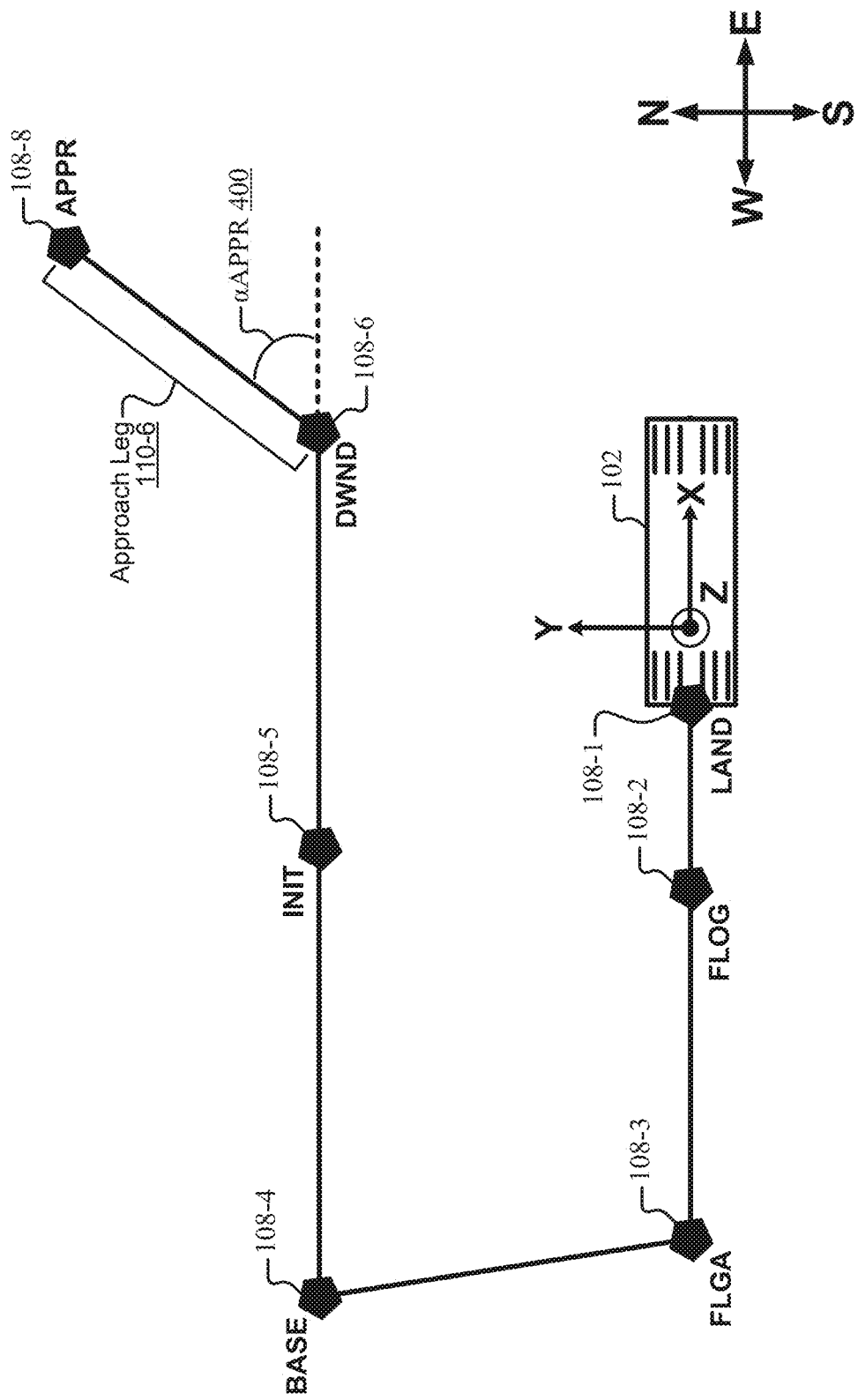
FIGS. 4A-4B illustrate example landing patterns that include an approach waypoint.
Figure 4B:
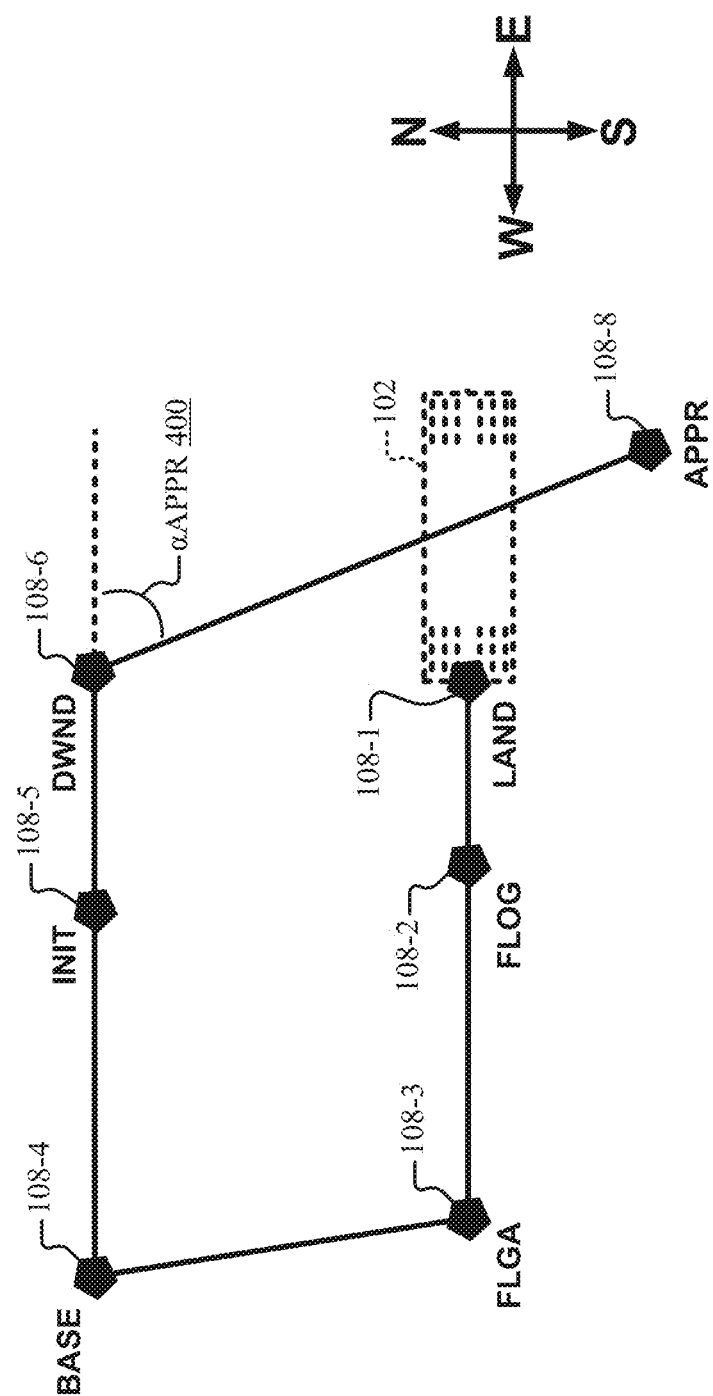

In some implementations, the landing pattern may include one or more additional waypoints outside of the legs defined in FIGS. 1-2. For example, with respect to FIGS. 4A-4B, the flight pattern may include an approach waypoint (APPR) 108-8 that is located outside of the quadrilateral formed by the waypoints of FIGS. 1-2. In some implementations, the APPR waypoint 108-8 may be used for approaching and joining the downwind leg 110-1 at the DWND waypoint 108-6. Although a single approach waypoint is illustrated in FIGS. 4A-4B, in some implementations, the AFMS 600 may generate additional waypoints for joining the landing patterns illustrated herein. For example, the AFMS 600 may generate additional waypoints that guide the aircraft to the APPR waypoint 108-8. In some implementations, the AFMS 600 may also generate additional waypoints prior to joining any of the other illustrated waypoints.

In FIGS. 4A-4B, the APPR waypoint 108-8 to the DWND waypoint 108-6 defines an approach leg 110-6. The angle 400 defined by the approach leg 110-6 and the downwind leg 110-1 may be referred to as the landing pattern approach angle (αAPPR) 400. In some implementations, the locations of the APPR waypoint 108-8 and the DWND waypoint 108-6 may be selected such that αAPPR 400 is approximately 45 degrees. Approaching at approximately 45 degrees or other shallower angles may allow the aircraft to ease into the downwind leg and allow the aircraft to more closely match the speeds of other aircraft on the downwind leg.

In FIG. 4A, the AFMS 600 selects an APPR waypoint 108-8 outside the landing pattern such that the downwind leg 110-1 is between the runway 102 and the APPR waypoint 108-8. The AFMS 600 may select the APPR waypoint 108-8 of FIG. 4A as a starting waypoint when approaching from the positive Y direction (e.g., the north). In FIG. 4B, the AFMS 600 selects an APPR waypoint 108-8 outside the landing pattern such that the approach leg 110-6 crosses the runway 102. The AFMS 600 may select the APPR waypoint 108-8 of FIG. 4B as the starting waypoint when approaching from the negative Y direction (e.g., the south).

The aircraft 100 may communicate with ATC 104 (e.g., an ATC tower). For example, the aircraft pilot(s) may communicate via radio with ATC 104. The aircraft pilot(s) and ATC 104 may exchange a variety of information, such as weather information, authorization to land, and sequencing of aircraft.

In FIG. 1, the aircraft 100 may also communicate with a remote aircraft operations center 106 (e.g., via a data connection or via a radio relay located on the aircraft). The aircraft operations center 106 may monitor and/or control operation of the aircraft 100. For example, human operators at the remote aircraft operations center 106 may monitor/control aircraft operations. In some implementations, a human operator at the aircraft operations center 106 may be in contact with ATC 104. In some implementations, the aircraft operations center 106 may gather information used to calculate the flight pattern data structures and transmit the gathered information to the aircraft 100 for onboard calculation of the flight pattern data structures. In some implementations, the aircraft operations center 106 may calculate the flight pattern data structures and transmit the flight pattern data structures to the aircraft. In some implementations, the aircraft 100 may transmit the flight pattern data structures to other parties, such as other aircraft, ATC 104, and/or the aircraft operations center 106.

Figure 6A:
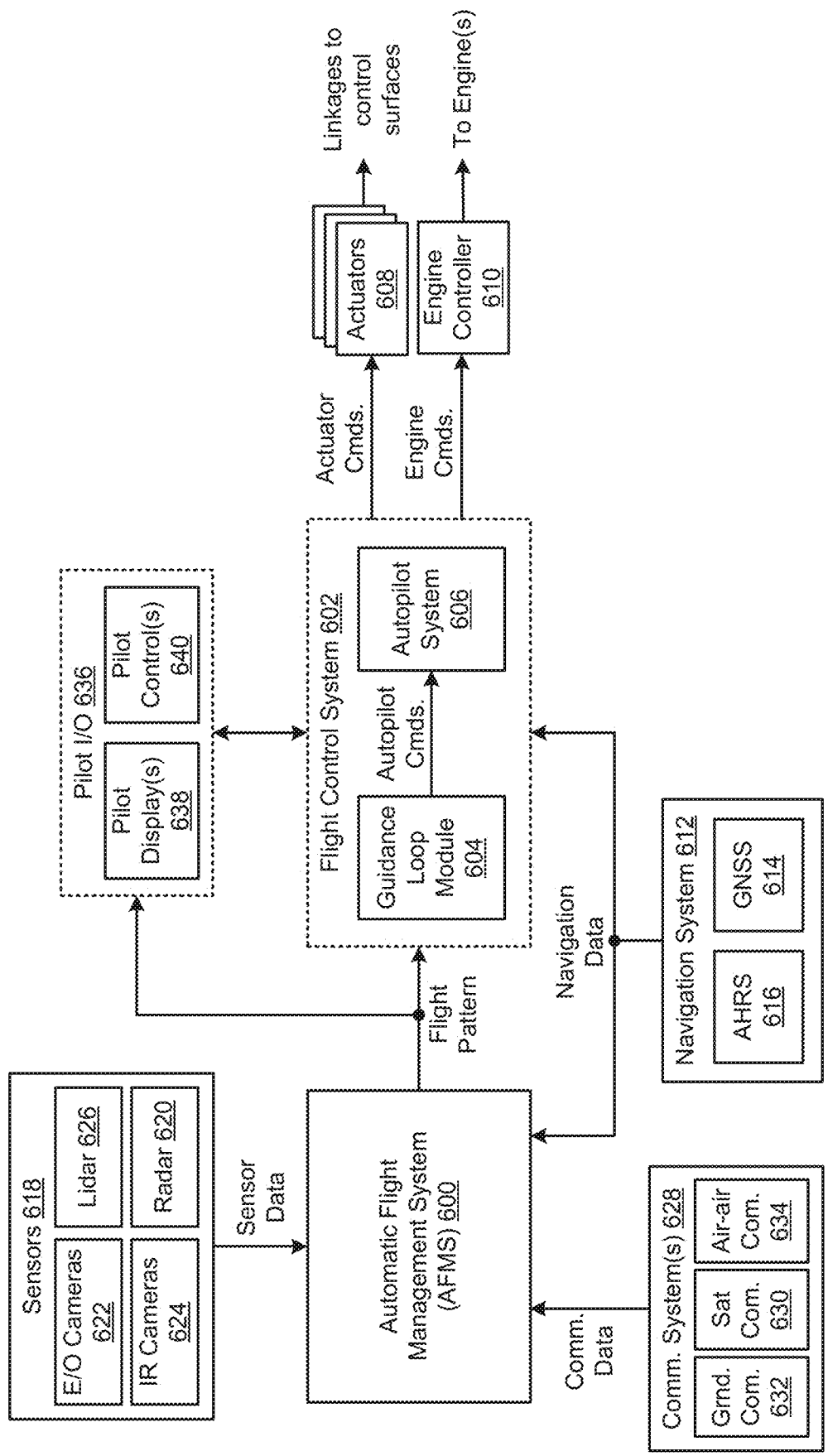
FIG. 6A is a functional block diagram of an example aircraft that includes an automatic flight management system.

FIG. 6A is a functional block diagram of example components included in an aircraft (e.g., an automated flight control system). The aircraft 100 includes the AFMS 600 that generates a flight pattern data structure. For example, the AFMS 600 may generate the flight pattern based on navigation data, sensor data, and communication data. The flight control system 602 and/or the pilot(s) may control the aircraft based on the generated flight pattern data structure.

In an autonomous/automated aircraft, the flight control system 602 may operate without human intervention and/or with remote pilot input. In some implementations, the aircraft 100 may include autonomy functions that fully replace the pilot. Some example functions may include contingency management, air traffic control integration, and perception. Contingency management functions may include responses to failure in the aircraft. Additionally, the contingency management functions may include identifying failures, isolating failures, and reconfiguring if possible. Additional functions may include generating an alternate flight plan and contacting emergency services. Example air traffic control integration functions may include communicating with air traffic control services. Example perception functions may include using data from sensors and interpreting the surrounding environment for making decisions based on the data. Additional example functions may include evaluating suitable landing sites.

The AFMS 600 generates the flight pattern data structure for the flight control system 602 and/or pilot. For example, the AFMS 600 may generate a landing pattern data structure, takeoff pattern data structure, and/or other flight pattern data structures. The flight control system 602 can control the aircraft 100 according to the flight pattern data structure along with other data. In some implementations, the flight pattern data structure may be output to a pilot interface (e.g., a display, such as a flight director display).

The flight control system 602 includes a guidance loop module 604 and an autopilot system 606. The guidance loop module 604 receives the landing pattern data structure. The guidance loop module 604 may also receive additional information regarding the state of the aircraft 100, such as a current location (e.g., a latitude/longitude/altitude), velocity, and aircraft attitude information. Based on the received information, the guidance loop module 604 generates autopilot commands. Example autopilot commands may include, but are not limited to, a heading command, an airspeed command, an altitude command, and a roll command.

The autopilot system 606 controls the aircraft 100 based on the received autopilot commands. For example, the autopilot system 606 can output control signals/commands that control various actuators 608 and engines on the aircraft 100. In a specific example, the output of the autopilot system may include actuator position commands and engine thrust commands. The autopilot system 606 may control a variety of aircraft parameters, such as heading, speed, altitude, vertical speed, roll, pitch, and yaw of the aircraft.

The aircraft 100 may include a plurality of control surfaces. Example control surfaces may include, but are not limited to, ailerons, tabs, flaps, rudders, elevators, stabilizers, spoilers, elerudders, ruddervators, flaperons, landing gears, and brakes for fixed-wing aircraft. Rotorcraft may include other controls/surfaces (e.g., rotor collective, cyclic, and tail rotor). The aircraft 100 can include actuators/linkages that control the control surfaces based on the commands generated by the autopilot system 606. The actuators and linkages may vary, depending on the type of aircraft.

The aircraft 100 may include an engine controller 610 that controls one or more aircraft engines. The engine controller 610 may control the engine(s) based on the received engine commands, such as thrust commands that indicate an amount of thrust. For example, the engine controller 610 may control fuel and other engine parameters to control the engines according to the received engine commands. In some implementations, the engine controller 610 may include a full authority digital engine control (FADEC) that controls the engines. Although the engine controller 610 is illustrated as separate from the autopilot system 606, in some implementations, the engine controller 610 can be integrated into the autopilot system 606. Example engines may include, but are not limited to, a piston engine, turboprop, turbofan, turbojet, jet, and turboshaft. In some implementations, the aircraft 100 may include one or more electric motors. In some implementations, the aircraft 100 may include a propeller system. In these implementations, a lever may control the pitch/RPM of the propeller.

The aircraft 100 includes a navigation system 612 that generates navigation data. The navigation data may indicate the location, altitude, velocity, heading, and attitude of the aircraft 100. The navigation system 612 may include a Global Navigation Satellite System (GNSS) receiver 614 that indicates the latitude and longitude of the aircraft 100. The navigation system 612 may also include an attitude and heading reference system (AHRS) 616 that may provide attitude and heading data for the aircraft, including roll, pitch, and yaw. The navigation system 612 may include an air data system that may provide airspeed, angle of attack, sideslip angle, altitude, and altitude rate information. The navigation system 602 may also include a radar altimeter and/or a laser altimeter to provide Above Ground Level (AGL) altitude information.

The aircraft 100 may include a plurality of sensors 618 that generate sensor data. For example, the aircraft 100 may include one or more radar systems 620, one or more electro-optical (E/O) cameras 622, one or more infrared (IR) cameras 624, and/or light detection and ranging systems (Lidar) 626. The Lidar systems 626 may measure distance to a target by illuminating the target with laser light and measuring the reflected light with a sensor. The radar systems 620 and cameras 622, 624 may detect other aircraft. Additionally, the sensors 618 (e.g., Lidar and cameras) may determine whether the runway is clear when approaching for a landing. In some implementations, potential obstacles (e.g., surrounding air traffic and weather) may be identified and tracked using at least one of, onboard and offboard radar, cameras, Automatic Dependent System-Broadcast (ADS-B), Mode C transponder, Mode S transponder, Traffic Collision Avoidance System (TCAS), Traffic Information Service-Broadcast (TIS-B), Flight Information Service-Broadcast (FIS-B), and similar services. The data from these sensors and services may be fused and analyzed to understand and predict the behavior of other aircraft in the air or on the ground.

In some implementations, the AFMS 600 may determine tracking data for surrounding aircraft. Tracking data for an aircraft may indicate the location, heading, and speed of the aircraft. In some implementations, the AFMS 600 may determine traffic classification data for each aircraft (e.g., see FIGS. 8A-8B). Example traffic classification data may indicate a leg (e.g., downwind, final, etc.) the aircraft is on and what runway the aircraft is using to land. Although the AFMS 600 (e.g., traffic classifier module 656) is illustrated and described herein as determining tracking data and traffic classification data, in some implementations, other systems/modules (e.g., a traffic classifier system) may determine the tracking data and the traffic classification data. In these implementations, the AFMS 600 may use the traffic classification data in the manner described herein, such as for runway-pattern selection and pattern planning.

The aircraft 100 may include one or more communication systems 628 described herein. For example, the aircraft 100 may include one or more satellite communication systems 630, one or more ground communication systems 632, and one or more air-to-air communication systems 634. The communication systems 628 may operate on a variety of different frequencies. In some implementations, the communication systems 628 may form data links. In some implementations, the communication systems 628 may transmit the flight pattern data structure to an aircraft operations center 106 and/or to ATC 104. The communication systems 628 may gather a variety of information, such as traffic information (e.g., location and velocity of aircraft), weather information (e.g., wind speed and direction), and notifications about airport/runway closures. In some implementations, a voice connection (e.g., ATC communication over radio VHF) may be converted to text for processing. In some implementations, the aircraft 100 can broadcast their own position and velocity (e.g., to the ground or other aircraft).

The aircraft 100 may include a pilot interface that may include pilot input/output devices 636. For example, the pilot interface may include one or more displays 638. In some implementations, the flight pattern data structure may be displayed on a pilot display 638 (e.g., on a flight director display) for the pilot's reference. The pilot interface may also include pilot controls 640, such as a flight yoke and manual buttons/switches. In some implementations, the pilot interface may include speakers, headphones, and/or microphones for radio communication.

The AFMS 600 may compute a flight pattern at a variety of different times. In some implementations, the AFMS 600 may compute a landing pattern before takeoff and/or while en route to the airport. For example, the AFMS 600 may calculate the landing pattern when the aircraft is within a predetermined time and/or distance from the runway 102. In this example, the AFMS 600 may be configured to automatically calculate the landing pattern data structure. In some implementations, the AFMS 600 may be manually instructed by the pilot to calculate the landing pattern data structure (e.g., via input on pilot controls 640 and/or displays 638).

The AFMS 600 may also be configured to automatically recompute the flight pattern in response to triggers, such as the appearance of obstacles in the flight path, the appearance of aircraft in the airspace, updates from ATC 104, runway availability, weather, and aircraft failures or contingencies. Additional triggers may include loss of command and control links, control actuator failures, sensor failures, aircraft damage, and/or temporary flight restrictions.

Figure 6B:
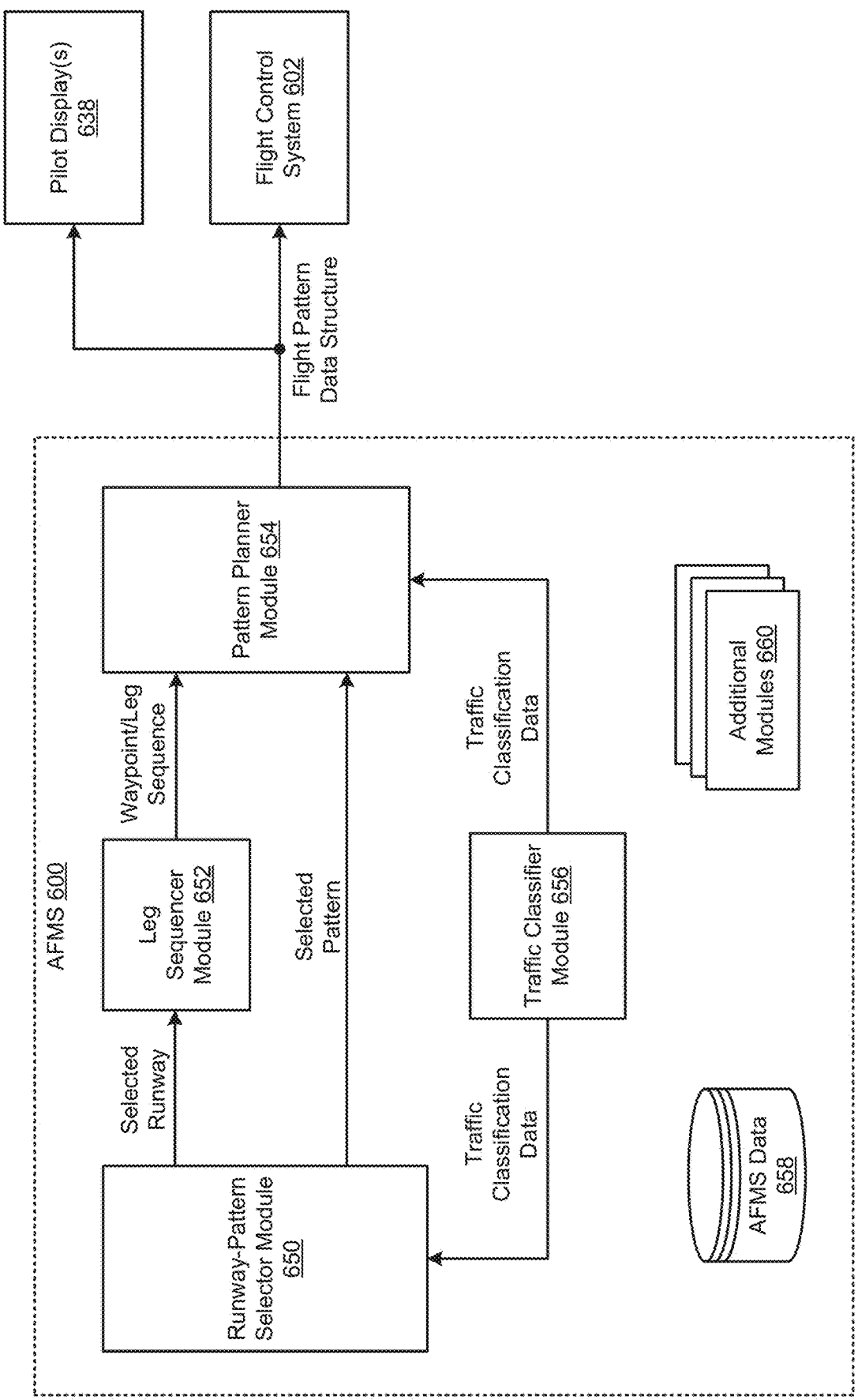
FIG. 6B is a functional block diagram of an example automatic flight management system.

FIG. 6B illustrates an example AFMS 600 that generates a flight pattern data structure. The AFMS 600 may include a runway-pattern selector module 650, a leg sequencer module 652, a pattern planner module 654, and a traffic classifier module 656. The runway-pattern selector module 650 may select a runway and a left or right traffic pattern (e.g., for landing). The leg sequencer module 652 may select a starting waypoint for the flight pattern data structure. The leg sequencer module 652 may also select a sequence of additional waypoints/legs to follow after the starting waypoint.

The pattern planner module 654 may generate the flight pattern data structure based on the selected runway, selected left/right pattern, and the selected waypoint/leg sequence. For example, the pattern planner module 654 may generate constraint equations for each waypoint, generate an objective function for maximizing/minimizing various quantities (e.g., altitude, speed, and/or timing), and then solve the objective function to determine the waypoint variable values (e.g., waypoint locations).

The traffic classifier module 656 may detect, track, and classify surrounding traffic as well as predict their behavior. The traffic classifier module 656 may receive data that includes ADS-B data, TIS-B data, TCAS data, Mode C data, Mode S data, camera data, Lidar data, radar data, and other traffic data. The traffic classifier module 656 may output traffic classification data that includes tracking data that indicates a location and direction of other aircraft, along with additional data that characterizes the other aircraft, such as the other aircraft's predicted runway and current leg. Traffic classification data can be used to select the runway, pattern plan, and to avoid other aircraft.

The AFMS 600 may include AFMS data 658 that may be used by modules included in the AFMS 600. In some implementations, the AFMS data 658 may be stored prior to takeoff. Additionally, or alternatively, the AFMS 600 may receive data from other systems/modules that the AFMS 600 may use to generate the flight pattern. Example AFMS data 656 may include sensor data, communication data, navigation data, and traffic classification data. Example AFMS data described herein may also be stored on other aircraft devices and provided to the AFMS 600.

The AFMS 600 may include additional modules 660, such as an ATC manager module 660-1 and a weather manager module 660-2. The ATC manager module 660-1 may acquire ATC information. For example, the ATC manager module 660-1 may interact with and request clearances from ATC 104 via VHF, satellite, or a data connection (e.g., the Internet). ATC traffic information may provide guidance and/or clearances for various operations in controlled airspace. The information from ATC may come from a radio using speech-to-text recognition or a digital data-link, such as Controller Pilot Data Link Communications (CPDLC) or from the Unmanned Traffic Management (UTM) System.

The weather manager module 660-2 may acquire the current and future weather information in the vicinity of the destination airport as well as any other source for weather in between the current location and the destination airport. The weather information can be provided via satellite, Internet, VHF, onboard weather radar, and Flight Information Services-Broadcast (FIS-B). The information from these and other sources may be fused to provide a unified representation of wind, precipitation, visibility, etc.

The AFMS 600 may include additional planning modules for en route planning, taxiing, and/or holding. The AFMS 600 may also include modules for vehicle management, such as optimizing fuel and trajectory based on the performance of the aircraft. In some implementations, the AFMS 600 may include a detect-and-avoid module to safely detect and avoid surrounding traffic. In some implementations, the AFMS 600 may also include a contingency/emergency management module.

Figure 7:
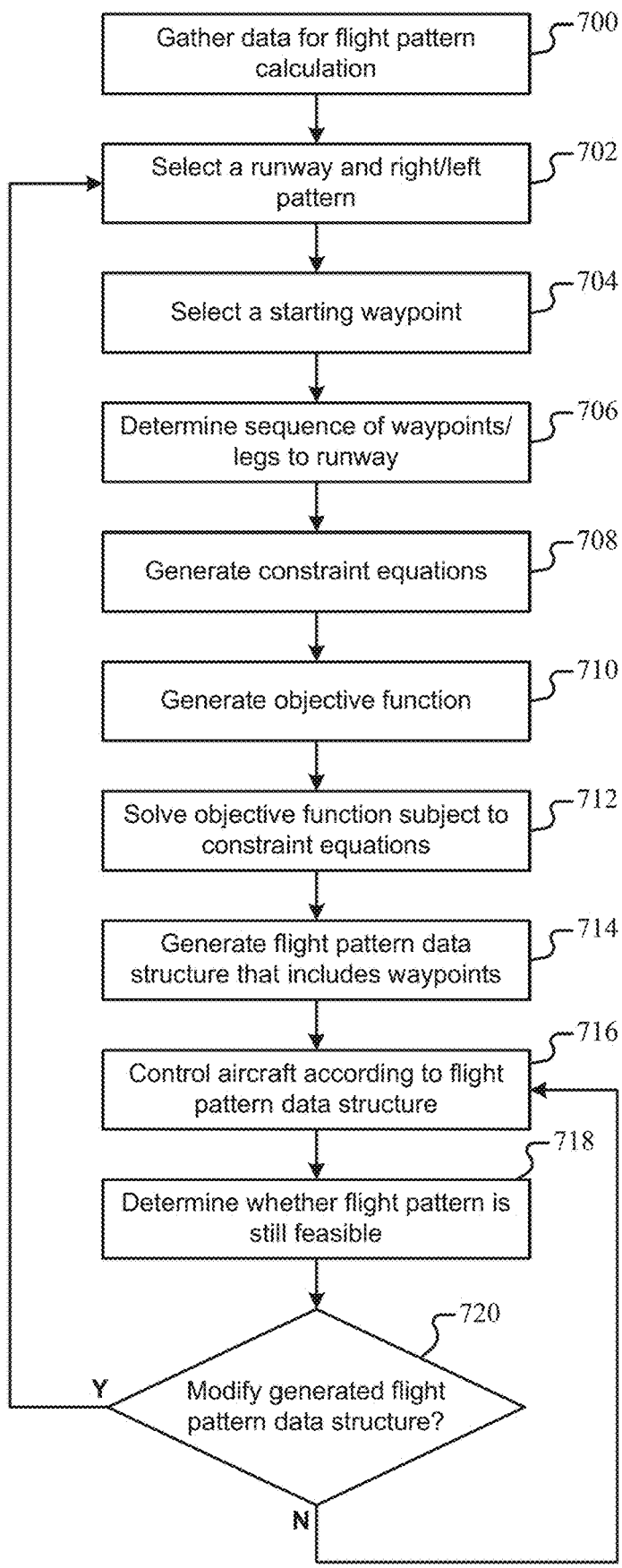
FIG. 7 illustrates an example method for generating a landing pattern data structure.

FIG. 7 illustrates an example method for generating a landing pattern data structure and controlling an aircraft according to the landing pattern data structure. The method of FIG. 7 is described with reference to the functional block diagrams of FIGS. 6A-6B. The method of FIG. 7 may be applied to generating any type of flight pattern data structure, such as a takeoff pattern data structure (e.g., see FIGS. 12A-12B).

In block 700, the AFMS 600 may gather data relevant to determining the flight pattern data structure. For example, the AFMS 600 may gather sensor data, navigation data, and communication data described herein. In block 702, the runway-pattern selector module 650 selects a runway from a plurality of selectable runways at an airport. Additionally, in block 702, the runway-pattern selector module 650 selects either a right pattern or a left pattern for the landing pattern. In block 704, the leg sequencer module 652 selects a starting waypoint for the landing pattern. For example, the leg sequencer module 652 may select a starting waypoint based on the location of the aircraft relative to the runway and the aircraft heading.

In block 706, the leg sequencer module 652 determines a sequence of waypoints/legs to the landing point on the selected runway. Each of the waypoints in the sequence of waypoints/legs determined in block 706 may be associated with various waypoint variables. For example, each waypoint may be associated with a latitude variable, longitude variable, and altitude variable. Similarly, each waypoint may be associated with an X, Y, Z coordinate variable (e.g., relative to the runway). In some examples, each waypoint may be associated with other variables, such as speed variables, timing variables, and/or other variables that may be subject to constraints and optimizations described herein. The variables associated with the waypoints in block 706 may initially have unspecified values. As such, the sequence of waypoints/legs in block 706 may include a sequence of waypoint/leg names, each of which may be associated with one or more unspecified variables. The pattern planner module 654 may generate values for the variables in block 712.

In block 708, the pattern planner module 654 determines constraint equations for the sequence of waypoints. For example, the pattern planner module 654 may determine one or more constraint equations for each of the waypoints. In a more specific example, the pattern planner module 654 may determine one or more location constraint equations for each of the waypoints that define constraints for the location of the waypoint in three dimensional space (e.g., X, Y, and Z relative to the runway).

In block 710, the pattern planner module 654 generates an objective function for optimizing various flight parameters, such as location values, timing values, speed values, and/or fuel values. In block 712, the pattern planner module 654 solves the objective function subject to the constraint equations. The solution generated by the pattern planner module 654 may include values for the variables associated with the waypoints. For example, the solution may include latitude values, longitude values, and altitude values associated with the waypoints. In some examples, the solution may include X, Y, Z coordinate values relative to the runway. The pattern planner module 654 may transform the X, Y, Z coordinate values to global latitude and longitude coordinates based on the latitude, longitude, and altitude of the runway, along with the runway direction. In some examples, the solution may include values for speed variables, timing variables, or other variables associated with the waypoint/leg sequence determined in block 706.

In block 714, the pattern planner module 654 generates the flight pattern data structure (e.g., the landing pattern data structure) based on the solution to the objective function. For example, the pattern planner module 654 may generate a landing pattern data structure that includes the sequence of waypoints and associated three dimensional locations of the waypoints.

In block 716, the flight control system 602 controls the aircraft 100 according to the generated flight pattern data structure. For example, the flight control system 602 (e.g., autopilot system 606) may control the actuators 608 and/or engine(s) to cause the aircraft 100 to follow the waypoints included in the flight pattern data structure. In block 718, the AFMS 600 may gather data relevant to determining the feasibility of the computed flight pattern data structure and determine whether the flight pattern is still feasible. In block 720, the AFMS 600 determines whether to modify the generated flight pattern data structure. For example, the AFMS 600 may modify the flight pattern data structure in response to data collected in block 718 that indicates the current flight pattern is not feasible.

FIGS. 8A-11B illustrate operation of the traffic classifier module 656, the runway-pattern selector module 650, the leg sequencer module 652, and the pattern planner module 654.

Figure 8A:
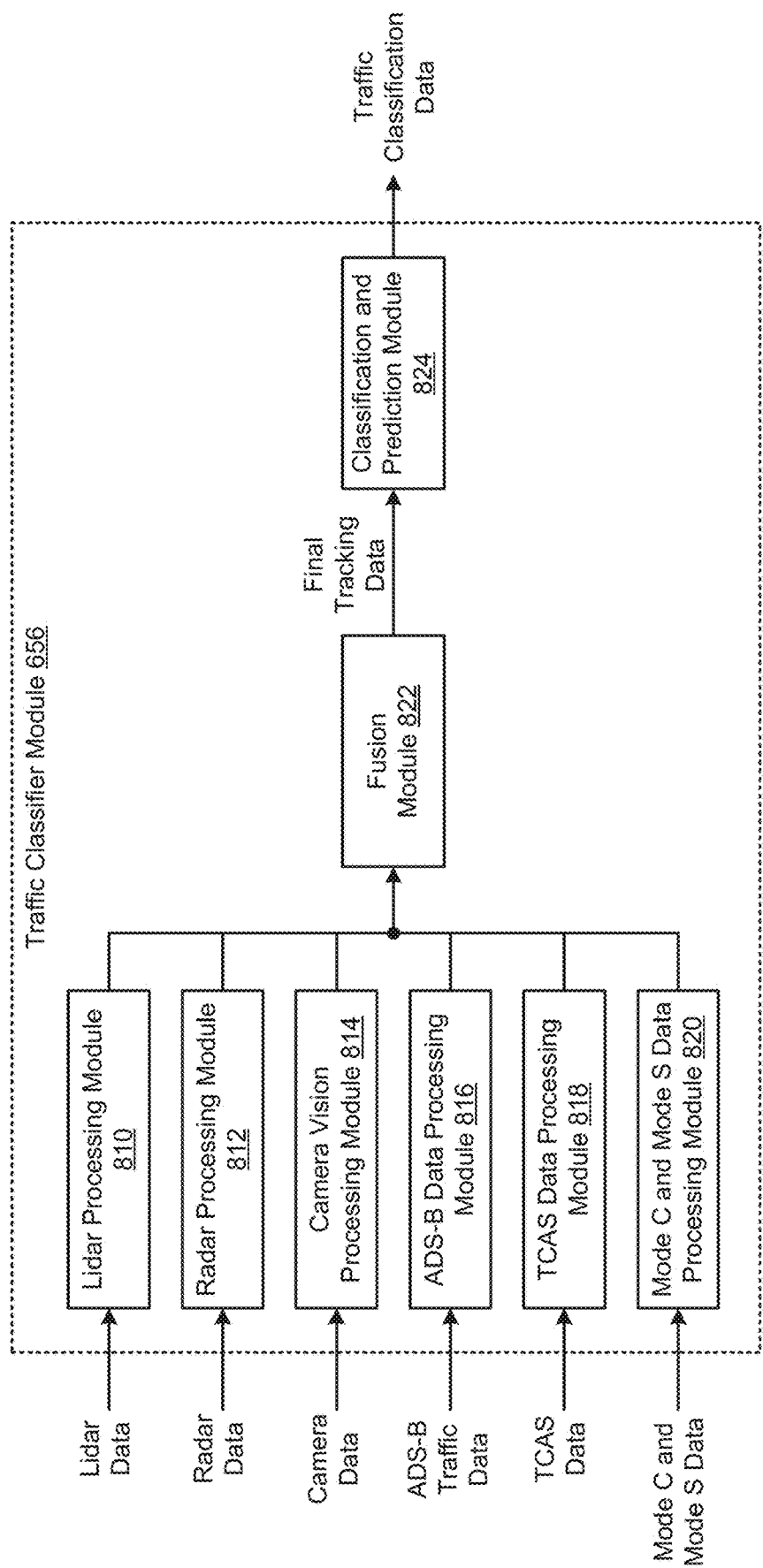
FIGS. 8A-8B illustrate operation of an example traffic classifier module.
Figure 8B:
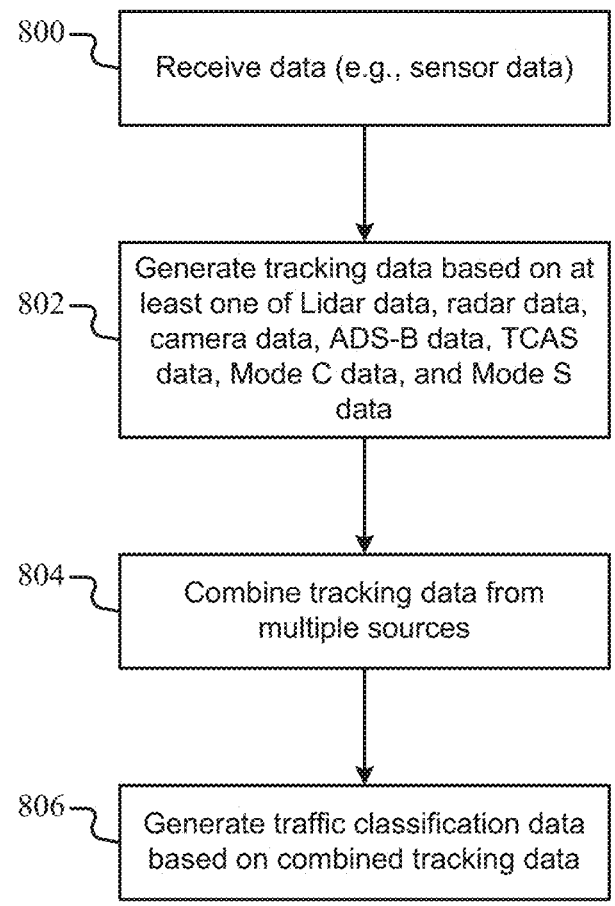

FIGS. 8A-8B illustrate operation of an example traffic classifier module 656. The method of FIG. 8B is described with respect to the traffic classifier module functional block diagram of FIG. 8A.

In block 800, the traffic classifier module 656 receives data (e.g., sensor data). Example data may include, but is not limited to, Lidar data, radar data, camera data (e.g., images), ADS-B traffic data, traffic collision avoidance system (TCAS) data, and data from Mode-C and Mode-S transponders. The various sensors may be used to detect moving objects. Lidar, radar, and cameras may provide target locations that are in a frame of reference relative the sensor itself. The target locations may then be geo-referenced in a global reference system using attitude, rate, velocity, and position information from an on-board inertial navigation system (INS) coupled with a GNSS that may rely on a combination of GPS, Beidou, Galileo, and Glonass. The geo-registration may be performed using accurate timing to precisely determine the location and velocity of the targets. ADS-B and TIS-B may provide target locations in global frame of reference. Although the targets may be geo-referenced in a global reference, in some cases, the targets may be tracked in a relative reference frame.

In block 802, the traffic classifier module 656 generates tracking data. The tracking data may indicate the current location/velocity of aircraft in the vicinity of the airport. In some implementations, the tracking data may include the type of aircraft as well, such as an airplane, helicopter, or balloon. The type of aircraft may be determined based on camera imagery, radar signatures, and/or observed maneuvering capabilities. In block 802, the tracking data may be generated by a corresponding processing module. For example, a Lidar processing module 810 may generate tracking data based on Lidar data generated by the Lidar 626. A radar processing module 812 may generate tracking data based on the radar data. A camera vision processing module 814 may generate tracking data based on the camera data (e.g., images). An ADS-B data processing module 816 may generate tracking data based on the ADS-B traffic data. A TCAS data processing module 818 may generate tracking data based on the TCAS data. A Mode C and Mode S data processing module 820 may generate tracking data based on the Mode C and Mode S data. The traffic classifier module 656 may also determine tracking data for aircraft using additional and/or alternative data, such as ground radar transmitted radio-frequency (RF) signals including traffic information system broadcast (TIS-B).

In block 804, the fusion module 822 may combine tracking data from the different sources (e.g., illustrated in FIG. 8A), such as tracking data from Lidar data, radar data, camera data, etc. In some cases, some tracking data from different sources may be for the same one or more aircraft. In these cases, the fusion module 822 may combine (e.g., "fuse") tracking data from different sources for the same aircraft. The fusion module 822 may output final tracking data that includes tracking data from one or more sources for each aircraft in the vicinity of the airport.

In block 806, the classification and prediction module 824 generates traffic classification data based on the final tracking data. Traffic classification data may include tracking data for each aircraft along with additional classifications/predictions associated with the aircraft. For example, the traffic classification data may indicate whether an aircraft is in a specific traffic pattern (e.g., a landing pattern, takeoff pattern, or holding pattern) along with which leg of the traffic pattern (e.g., a downwind leg). Additionally, the traffic classification data may indicate the runway on which the aircraft is likely to land.

Figure 9A:
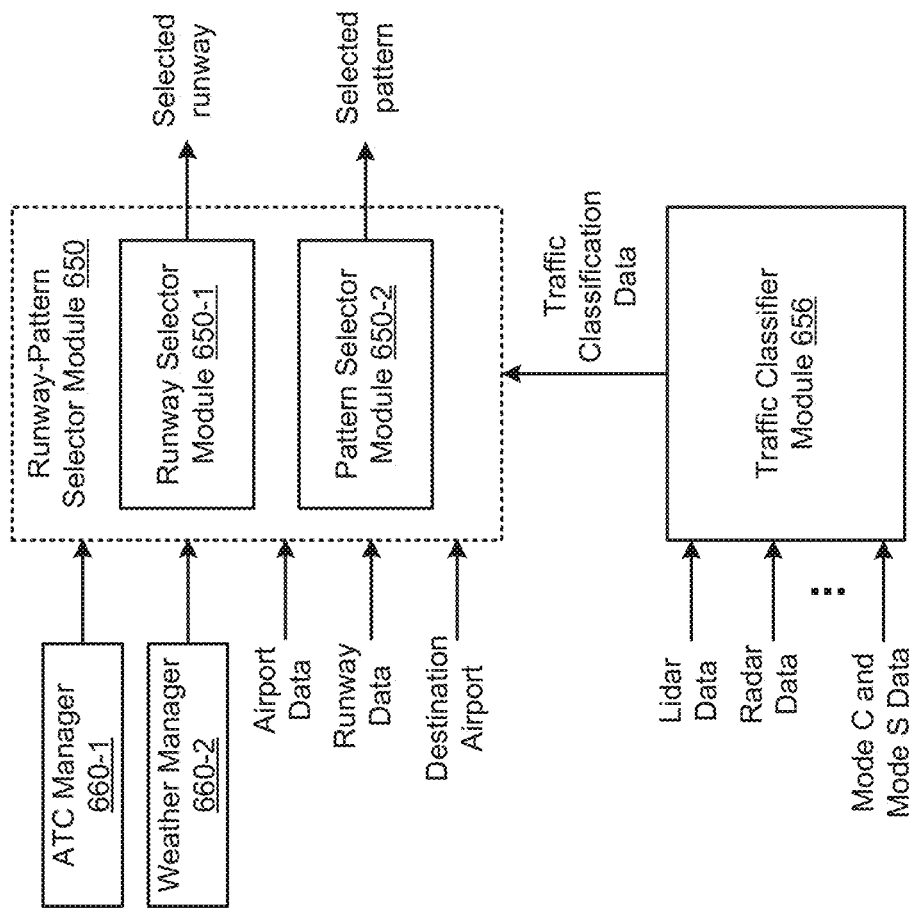
FIGS. 9A-9B illustrate operation of an example runway-pattern selector module.
Figure 9B:
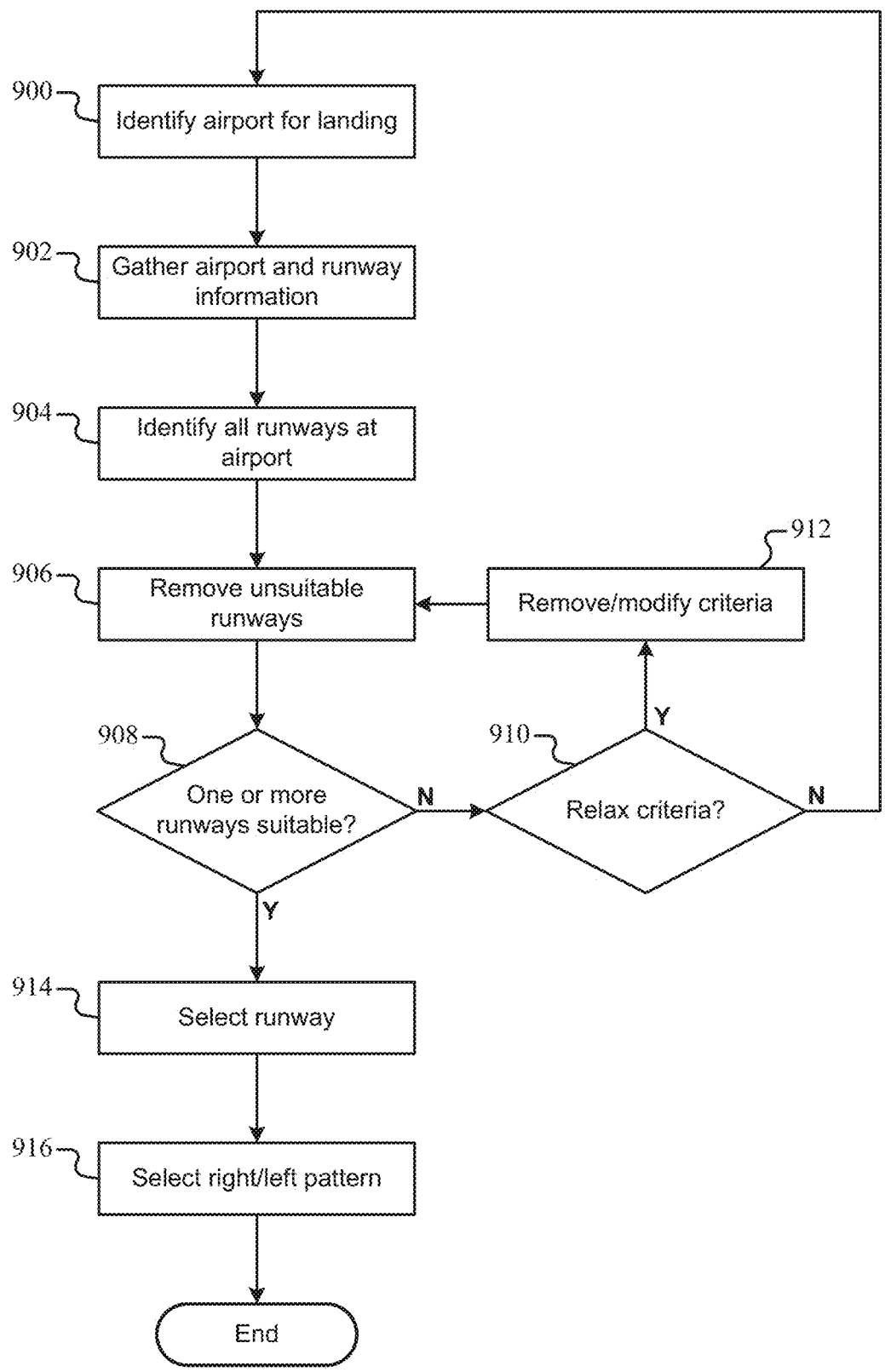

FIGS. 9A-9B illustrate operation of an example runway-pattern selector module 650. The method of FIG. 9B is described with respect to the runway-pattern selector module 650 illustrated in FIG. 9A. In block 900, the runway-pattern selector module 650 identifies an airport for landing. For example, the pilot or operator in the aircraft operations center 106 may manually input the airport (e.g., before takeoff or en route). Alternatively, the airport can be chosen by a contingency manager. In block 902, the runway-pattern selector module 650 gathers airport and runway information. Example information may include airport/runway information that lists the available runways at the airport along with the location and orientation of the runways. Additional information may include, but is not limited to, weather information at the airport (e.g., wind and gust speed and/or direction), runway closures, approach procedures, available landing instrumentation systems, and traffic information for the airport.

In some implementations, the runway selector module 650-1 may select the runway based on traffic classification data. Example traffic classification data may include which runway is being used for landing and how many aircraft are using the runway for landing and/or takeoff. The traffic classification data may be used to determine whether the runway is suitable for landing. The traffic classification data may also be used for selecting the most suitable runway when multiple runways are available.

In block 904, the runway selector module 650-1 identifies all runways (e.g., runway numbers) at the airport based on the airport and runway information. One physical runway may count as two runways when it is possible to land in both directions. In block 906, the runway selector module 650-1 may downselect (e.g., remove) the runways that are not suitable for landing. The runway selector module 650-1 may determine that a runway is suitable for landing based on at least one of: 1) whether the runway is currently active, 2) the wind speed/direction relative to the runway, 3) the size of the runway, 4) the runway conditions (e.g., dry, wet, snow), 5) the type of runway (e.g., asphalt, gravel, dirt), and 6) aircraft performance. For example, the runway selector module 650-1 may determine that a runway is suitable for landing when the runway is open and is long enough and/or wide enough for landing. As another example, the runway selector module 650-1 may determine that the runway is suitable for landing when the headwind and/or crosswind are within acceptable limits. In some implementations, runways may be subject to multiple different runway selection criteria. For example, the runway selector module 650-1 may identify a runway as suitable if the runway is large enough to land in the current wind conditions.

In block 908, after the downselection process, the runway selector module 650-1 may determine whether there are one or more runways that are suitable. If no runways are suitable, the runway selector module 650-1 may determine whether to relax the runway selection criteria in block 910. The runway selector module 650-1 may relax the runway selection criteria by removing or modifying one or more of the criteria in block 912. For example, the runway selector module 650-1 may remove runway selection criteria for an amount of headwind and/or decrease the amount of desired headwind for the runway.

If the runway selector module 650-1 is unable to relax the runway selection criteria, the runway selector module 650-1 may select another airport for landing in block 900 (e.g., from airport data). The runway selector module 650-1 may also notify the pilot and/or remote operator. Selection of another airport may be caused by a change in weather at the currently selected airport or an accident at the airport, for example.

If one or more runways are suitable for landing, the runway selector module 650-1 may select one of the runways for landing in block 914. For example, the runway selector module 650-1 may select the landing runway based on runway preference criteria that may include, but are not limited to: 1) the opposite runway (e.g., same physical runway, but used to land in the opposite direction) may not be in use, 2) no crossing runway is in use, 3) an airport preferred runway, 4) amount of runway traffic, 5) the length of the runway, and/or 6) received ATC instructions. For example, if two or more runways are suitable for landing, the runway selector module 650-1 may select the runway with the better crosswind. As another example, if two or more runways are suitable for landing, the runway selector module 650-1 may select the runway with less traffic (e.g., fewer aircraft preparing for landing). As another example, if two or more runways are suitable for landing, the runway selector module 650-1 may select the runway with length that is best suited to the aircraft 100, such as a runway that is not excessively long for the aircraft 100 (e.g., in order to preserve the runway for larger aircraft).

In some implementations, the runway preference criteria may be sorted by order of importance to rank all suitable runways. The runway selector module 650-1 may output the most suitable runway given the current conditions. Although the runway may be automatically selected by the runway selector module 650-1, in some cases, the pilot or remote operator may manually select the runway.

In block 916, the pattern selector module 650-2 may select a right pattern or a left pattern for landing on the selected runway. The right/left pattern may refer to the side of the runway on which the landing pattern is located. The pattern selector module 650-2 may select the side of the runway for landing based on various restrictions associated with the sides of the runway. For example, the pattern selector module 650-2 may remove a side of the runway for landing if there are physical obstacles present, such as terrain (e.g., hills/mountains) or other objects. As another example, the pattern selector module 650-2 may remove a side of the runway for landing if there are other restrictions associated with the side of the runway, such as noise restrictions. The pattern selector module 650-2 outputs the selected right/left pattern. The selected pattern direction may affect the polarity of various constraints in the constraint generator module.

Figure 10A:
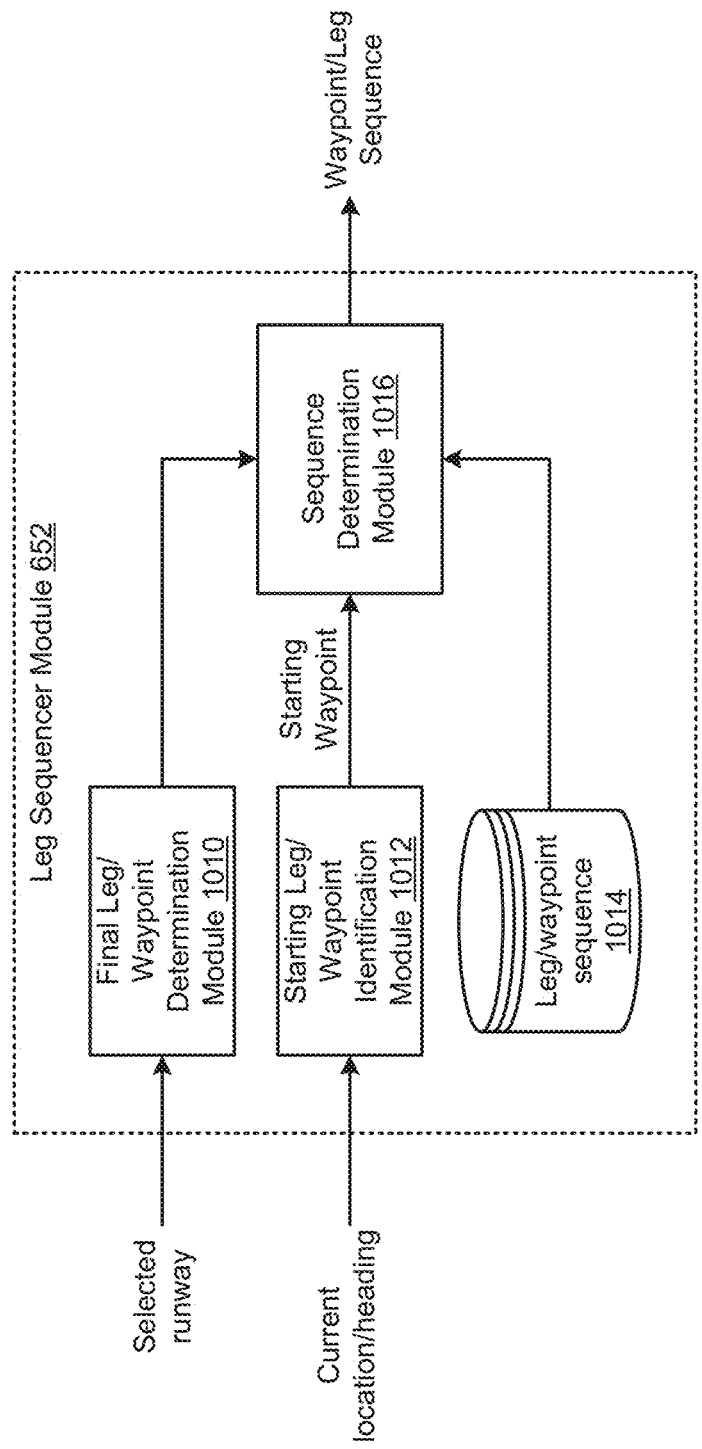
FIGS. 10A-10C illustrate operation of an example leg sequencer module.
Figure 10B:
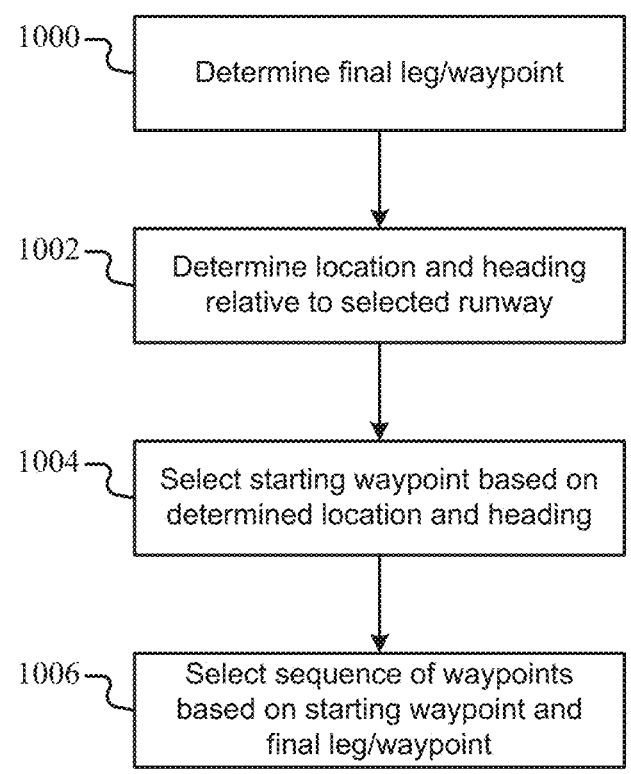
Figure 10C:
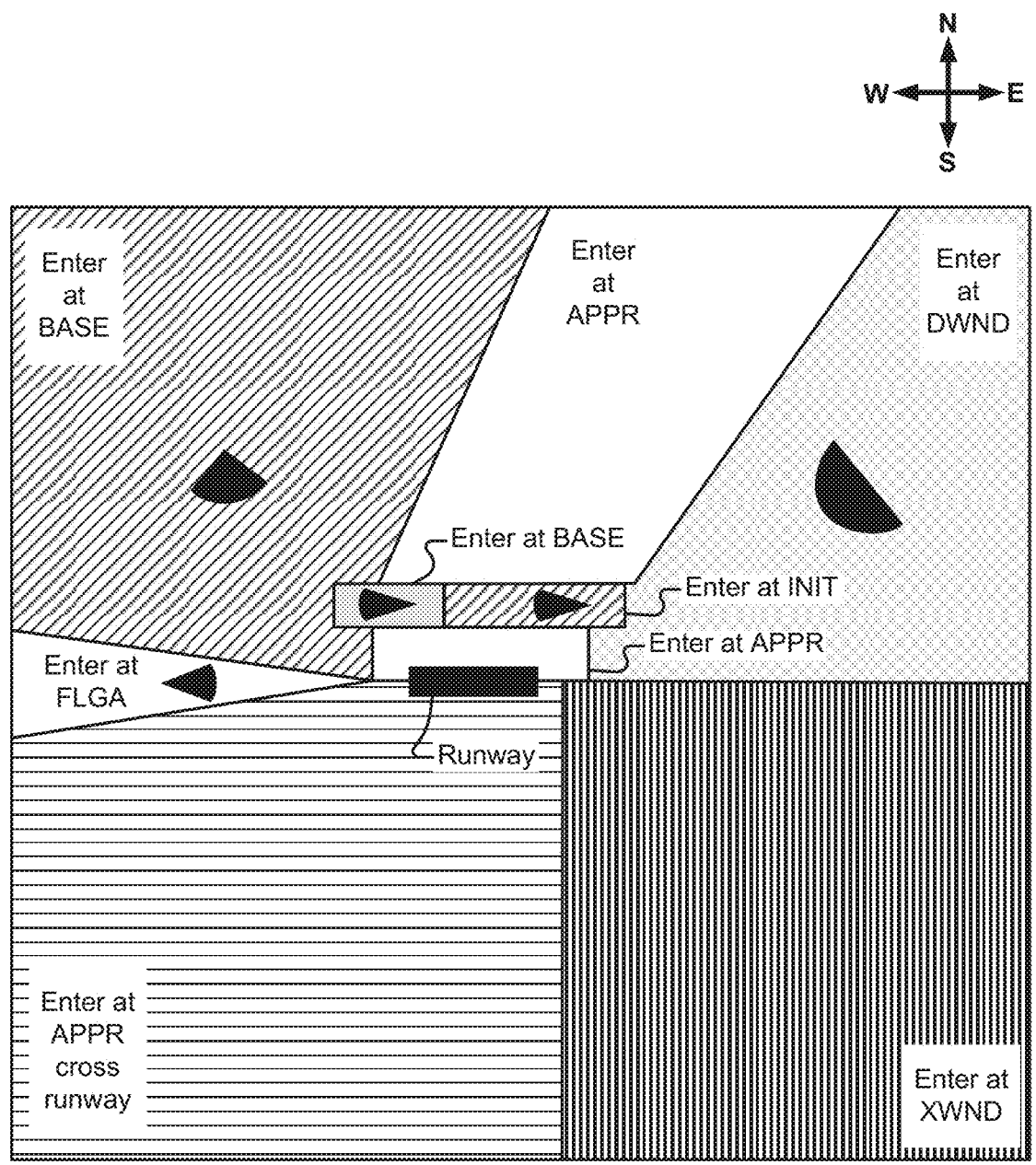

FIGS. 10A-10C illustrate operation of an example leg sequencer module 652. The method of FIG. 10B is described with respect to the leg sequencer module 652 illustrated in FIG. 10A and the starting waypoint selection map of FIG. 10C.

In block 1000, the final leg/waypoint determination module 1010 determines the final leg/waypoint of the flight pattern. For landing patterns, the final leg/waypoint determination module may use the LAND waypoint 108-1 for the selected runway. In block 1002, the starting leg/waypoint identification module 1012 (hereinafter "starting waypoint module 1012") determines the current location and heading of the aircraft. In block 1004, the starting waypoint module 1012 selects the starting waypoint. For example, the starting waypoint module 1012 may determine the starting waypoint based on at least one of aircraft location (e.g., aircraft latitude/longitude) and aircraft heading. In some implementations, the starting waypoint module 1012 may determine the starting waypoint based on additional data, such as aircraft altitude, aircraft speed, and/or traffic classification data.

Example starting waypoint selection criteria are graphically illustrated and described with respect to FIG. 10C. The starting waypoint selection criteria illustrated in FIG. 10C include aircraft location and heading. The graphic illustrates example current locations and associated starting waypoints. Possible locations of the aircraft and associated starting waypoints are illustrated as regions with different patterns/shading. For example, an aircraft in the northwest corner of the graphic may enter at the BASE waypoint. As another example, an aircraft location in the southwest corner or southeast corner may enter at the APPR waypoint across the runway (e.g., see FIG. 4B) or the XWND waypoint, respectively.

The graphic also indicates a heading criterion associated with each area. The heading criteria are represented as darkened arc regions in which the rounded portion of the arc indicates a heading for the region. Areas without a darkened arc region may be regions that have no heading criteria or a relaxed heading criteria (e.g., in nearly any direction). The heading indicated by the arcs may be more relevant the closer the aircraft is to the runway. In some implementations, the starting waypoint module 1012 may select a starting waypoint when both the location of the aircraft and the heading of the aircraft match the starting waypoint criteria. In some implementations, the starting waypoint module 1012 may default to a starting waypoint, such as APPR, if other waypoints are not sufficient according to the starting waypoint criteria.

In some implementations, the starting waypoint module 1012 may select the starting waypoint based on traffic classification data. For example, the starting waypoint module 1012 may select the starting waypoint based on whether air traffic is present in the vicinity of the airport and/or the amount of air traffic (e.g., the number of aircraft in the vicinity of the airport). If multiple additional aircraft are present, the starting waypoint module 1012 may select/reject a waypoint based on whether the aircraft can insert itself in between other additional aircraft while maintaining an appropriate distance. In some implementations, ATC 104 can provide instructions that can assist in selecting the starting waypoint. In some implementations, the pilot may manually select the starting waypoint based on visuals, instruments, and/or ATC instructions. As described herein, in some implementations, the starting waypoint module 1012 may select the starting waypoint based on the amount of traffic in the vicinity of the airport. For example, the starting waypoint module 1012 may select the starting waypoint as the approach waypoint (APPR) in cases where there is greater than a threshold amount of traffic in the vicinity of the airport (e.g., greater than a threshold number of aircraft).

In block 1006, a sequence determination module 1016 determines the sequence of waypoints for the flight pattern based on the starting waypoint and the final leg/waypoint. For example, the sequence determination module 1016 may determine the waypoint sequence by traversing the waypoint sequence data structure 1014 (e.g., see FIG. 5) from the starting waypoint to the final waypoint. In the case of a landing pattern, the sequence determination module 1016 may determine the waypoint sequence starting with the starting waypoint and traversing the waypoint sequence data structure until the LAND waypoint. Although the waypoint sequence data structure of FIG. 5 is directed to generating a landing pattern, other waypoint sequence data structures may be generated for other flight patterns (e.g., see takeoff sequence of FIG. 12A). The sequence determination module 1016 outputs the waypoint/leg sequence.

Figure 11A:
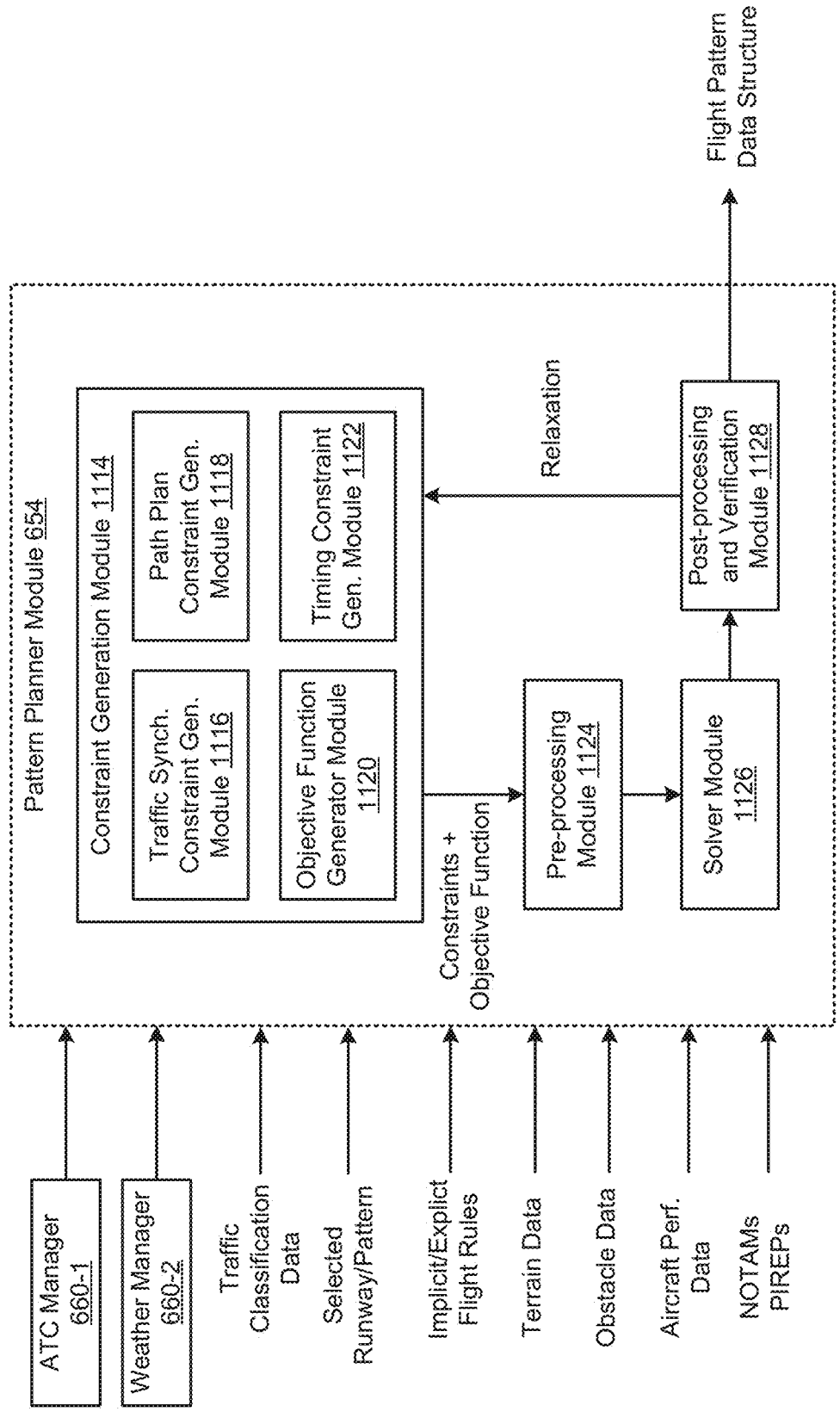
FIGS. 11A-11B illustrate operation of an example pattern planner module.
Figure 11B:
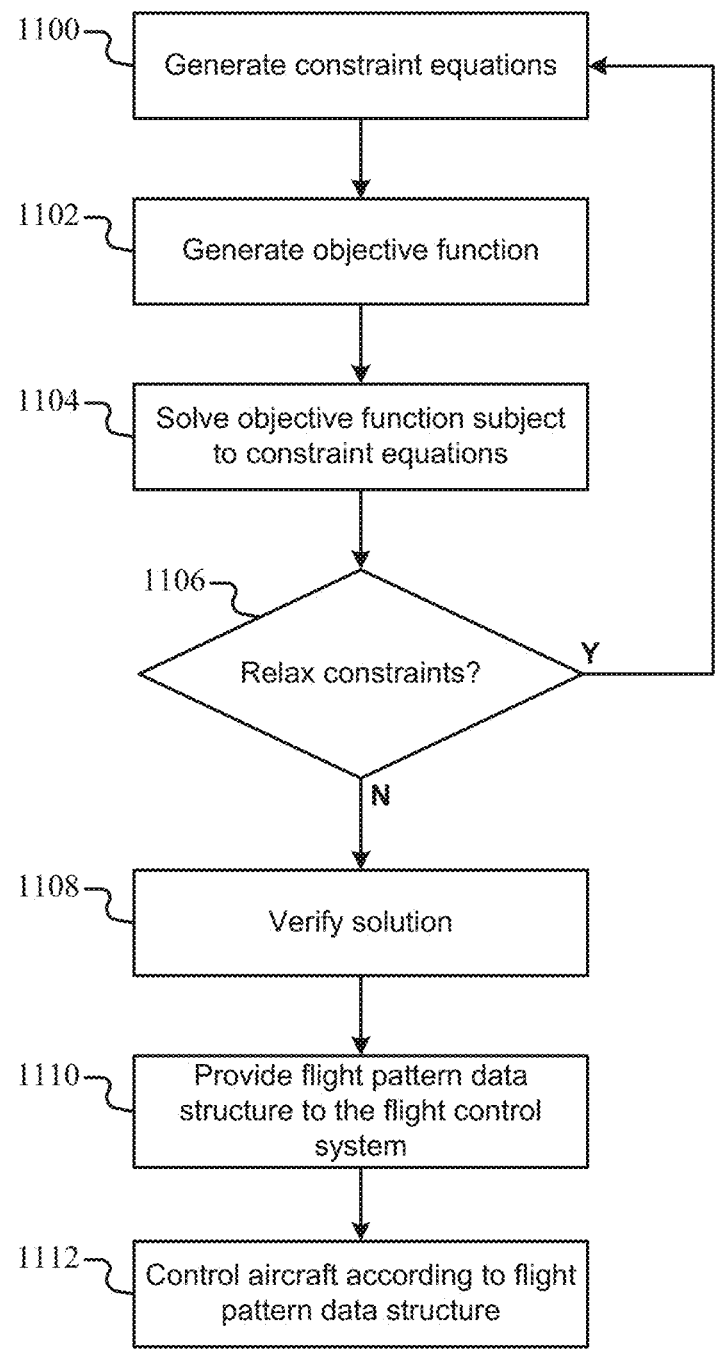

FIGS. 11A-11B illustrate operation of an example pattern planner module 654. The method of FIG. 11B is described with respect to the pattern planner module 654 illustrated in FIG. 11A. The pattern planner module 654 generates the flight pattern data structure based on the selected runway, waypoint/leg sequence, traffic classification, and additional data. Example additional data may include ATC information, weather information, implicit/explicit flight rules, terrain and obstacle data, aircraft performance data, airspace restrictions, Notices to Airmen (NOTAMs), and pilot reports (PIREPs). Implicit and explicit flight rules may be derived from the Federal Aviation Regulations (FARs), the Aeronautical Information Manual (AIM), and collective pilot experience. This information may define how pilots are expected to fly their aircraft in the proximity of other aircraft and how they should interact with ATC 104.

Example terrain and obstacle data may include geometric descriptions of terrain (e.g., hills/mountains) and obstacles including geolocation and elevation. Example aircraft performance data may include aircraft (e.g., autonomous aircraft) specifications that define the maneuvers that the aircraft is capable of performing (e.g., maximum climb rate, descent rate, stall speed, etc.). Airspace restrictions, NOTAMs, PIREPs and other information may be published by the FAA and can be retrieved via an onboard internet connection. This may provide important information regarding current conditions, temporary obstacles, airspace restrictions, runway closures, etc. FIG. 11A illustrates example data used by the pattern planner module 654.

The pattern planner module 654 may use data described herein with respect to FIG. 11A, along with other data, to generate constraints and objectives that are the inputs to an optimization problem. A path planning optimizer may solve the optimization problem, thereby generating a flight pattern data structure that is dynamically feasible, safe, and that satisfies airspace, weather, traffic, and other constraints.

A flight pattern may be defined as a sequence of waypoints (e.g., physical locations in 3D space, such as GPS coordinates) or as a sequence of legs (e.g., straight lines in 3D space). A straight line connecting two waypoints may be referred to as a leg, each of which has the name of the waypoint located at its beginning (in the direction of flight). The optimization problem described herein may be equivalent using waypoints or legs. Waypoints are used herein. Waypoints may additionally include information, such as desired airspeed, ground speed, time of arrival, or other parameters described herein. The flight control system 602 may be configured to accept the sequence of waypoints as inputs and command the aircraft 100 such that the aircraft's trajectory passes through the waypoints and its airspeed, ground speed, time of arrival, and other parameters at the waypoint matches those requested parameters.

In block 1100, a constraint generation module 1114 generates a set of constraint equations for each of the waypoints. The set of constraint equations for each waypoint, referred to herein as "waypoint constraint equations," may include one or more constraint equations. The constraint equations may place constraints on various parameters associated with the waypoints, such as waypoint location, time, and airspeed. The different constraint equations may be referred to as different "constraint equation types." Each waypoint may be subject to one or more constraint equation types. Any type of constraint equation described herein may be used at any single waypoint.

In some implementations, the constraint generation module 1114 (e.g., the path plan constraint generation module 1118) may generate location constraint equations for each waypoint. Location constraint equations for each waypoint may constrain the location of the waypoint in three dimensional space. For example, the waypoint may be subject to location constraints with respect to latitude, longitude, and altitude. As another example, the waypoint may be subject to location constraints with respect to X, Y, and Z coordinates, which may be relative (e.g., relative to the runway). The location constraint values for X, Y, and Z may be defined relative to the landing waypoint LAND 108-1 (0, 0, 0) at the runway 102. In some implementations, the path plan constraint generation module 1118 may generate path planning constraints based on terrain and/or obstacles.

In some implementations, the constraint generation module 1114 may generate different types of constraint equations other than location constraint equations. For example, other types of constraint equations may include speed constraints (e.g., ground/air speed constraints) for the aircraft at the waypoints. For example, a minimum airspeed may be set at the stall speed for the aircraft. Other example types of constraint equations may include timing constraints for the aircraft at the waypoints (e.g., with respect to time of arrival at the waypoint). In one example, a waypoint may be subject to timing constraints with respect to arrival at the landing waypoint LAND 108-1. Other example types of constraint equations may include fuel constraints. Additional example constraints may include aircraft performance constraints, such as constraints on the dimensions of the flight pattern (e.g., minimum leg lengths). For example, larger and faster airplanes may extend the length of the legs for landing. In some implementations, the pilot or other aircraft operator may provide manual constraints. Example manual constraints may include a provided time of arrival.

A timing constraint generation module 1122 may generate timing constraints based on the ATC-provided time of arrival, or other time of arrival. A traffic synchronization constraint generation module 1116 (hereinafter "traffic synch module 1116") may generate constraints based on traffic classification data. For example, the traffic synch module 1116 may generate timing constraints, speed constraints, and distance constraints relative to other aircraft. In a specific example, the traffic synch module 1116 may generate location constraints, timing constraints, and/or speed constraints that constrain the aircraft to follow an identified aircraft at a specific distance and/or time delay. In another specific example, the traffic synch module 1116 may determine when another aircraft is landing and generate timing constraints for landing a period of time after the other aircraft.

In block 1102, an objective function generator module 1120 generates an objective function. The objective function may include one or more objective function terms associated with optimizing various flight parameters described herein. For example, the objective function may include terms for minimizing/maximizing location values, timing values, speed values, and/or fuel values. As another example, the objective function may include terms for minimizing/maximizing altitude, lengths of legs, width of the landing pattern, time of arrival (e.g., relative to another aircraft), time of flight, distance from other aircraft, and/or fuel consumption. The objective function terms may be included in a final objective function. For example, the final objective function may include a sum of the individual objective function terms.

In some implementations, the path planner module 654 may include a pre-processing module 1124 that pre-processes the constraint equations prior to solving the objective function. For example, the pre-processing module 1124 may be configured to remove redundant constraints.

In block 1104, a solver module 1126 may solve the final objective function subject to the constraint equations. For example, the solver module 1126 may minimize the objective function subject to the constraints. The solver module 1126 may output the waypoint values for the solved objective function. The problem may be formulated in a variety of manners. For example, the problem may be formulated as at least one of a linear problem (LP), an integer problem (IP), a mixed-integer linear problem (MIP), and a quadratic problem. The solver module 1126 may implement one or more algorithms that may include, but are not limited to, Branch-and-Bound, Branch-and-cut, a simplex algorithm, a dual simplex method, an upper bound technique, dynamic programming, quadratic programming, and non-convex programming.

A post-processing and verification module 1128 (hereinafter "post-processing module 1128") receives the solution from the solver module 1126. In block 1106, the post-processing module 1128 determines whether to relax the constraints. For example, the post-processing module 1128 may relax the constraints when the solver module 1126 indicates that there is not a viable solution for the objective function. In this implementation, the constraint generation module 1114 may relax some constraints by removing constraints and/or modifying the values of some constraints in block 1100.

In block 1108, the post-processing module 1128 may verify the solution. For example, the post-processing module 1128 may generate the trajectory of waypoints for the flight pattern based on the solution and verify that the trajectory is valid for the aircraft based on current conditions, such as weather, terrain, and the location of other aircraft. If the solution is not viable, the AFMS 600 may recalculate the flight pattern. In block 1110, the post-processing module 1128 provides the flight pattern data structure to the flight control system 602. In block 1112, the flight control system 602 controls the aircraft 100 according to the flight pattern data structure.

The following description and equations show an example implementation of constraints for entering and flying in a traffic pattern. The problem may be formulated in a frame of reference relative to the runway where the aircraft will land, but can be generalized to other frames of reference. The origin of the frame is at the runway threshold. The positive x-axis is aligned with the landing direction along the selected runway. The positive z-axis is up and the positive zy-axis forms a right-handed frame (e.g., it points to the left of the runway). In the text that follows, the coordinates of a given waypoint are referred to as a tuple (x,y,z). The coordinates of the next waypoint are referred to as a tuple (x_next, y_next, z_next). For instance, when describing waypoint N that is before waypoint M, the following notations are used: (x,y,z) represents the coordinates of waypoint N and (x_next, y_next, z_next) represent the coordinates of waypoint M. Angles are expressed in degrees. Example leg constraints are described below.

Final on glideslope (FLOG)

The FLOG waypoint defines the final approach to the runway, just before landing, when the aircraft is aligned with the runway, on glideslope.

The FLOG waypoint may be before the runway $$x<0$$

The FLOG waypoint may be at least $L_{FLOG}^{min}$ meters away from the runway and at most $L_{FLOG}^{max}$ meters away from the runway $$-L_{FLOG}^{min} \leq x \leq -L_{FLOG}^{max}$$

The FLOG waypoint may be aligned with the runway $$y=0$$

The FLOG waypoint may be on the preferred glideslope:

$$z=|x|*\tan \gamma_{FLOG}$$

where $\gamma_{FLOG}$ is the approach angle (e.g., always positive), typically 3 degrees but can be dynamically modified based on aircraft performance, obstacle avoidance, or other external factors.

The FLOG waypoint may be between $AGL_{FLOG}^{min}$ and $AGL_{FLOG}^{max}$ meters above the runway threshold $$AGL_{FLOG}^{min} \leq z \leq AGL_{FLOG}^{max},$$

where AGL stands for Above Ground Level and is referenced to the runway threshold.

Note that for the problem to be feasible, the following constraints between the parameters should be true.

$$L_{FLOG}^{min}>0,$$

$$L_{FLOG}^{max}>0,$$

$$L_{FLOG}^{max} \leq L_{FLOG}^{max},$$

$$AGL_{FLOG}^{min} \leq L_{FLOG}^{max}*\tan \gamma_{FLOG}, \text{ and}$$

$$AGL_{FLOG}^{max} \geq L_{FLOG}^{min}*\tan \gamma_{FLOG}.$$

Final Leg Glideslope Acquire (FLGA)

The FLGA waypoint defines the leg when the aircraft is aligned with the runway, at constant altitude, before acquiring the glideslope. Its next leg is the FLOG leg.

The FLGA waypoint may be before the runway:

$$x<0$$

The FLGA waypoint may be further away from the runway than the next waypoint (FLOG in this case):

$$x \leq x_{next}$$

The FLGA waypoint may be at least MIN_FLGA_LENGTH meters away from the runway:

$$x \leq -\text{MIN\_FLGA\_LENGTH}$$

The FLGA waypoint may be no further than MAX_FLGA_LENGTH meters away from the runway $$x \geq -\text{MAX\_FLGA\_LENGTH}$$

The FLGA waypoint may be aligned with the runway $$y=0$$

The FLGA waypoint may be at the same altitude as the next waypoint (FLOG)

$$z=z_{next}$$

Note that for the problem to be feasible, the following constraints between the parameters may be satisfied:

$$L_{FLGA}^{min} \leq L_{FLGA}^{max}$$

$$L_{FLOG}^{min} \leq L_{FLGA}^{min}$$

$$L_{FLOG}^{max} \geq L_{FLGA}^{max}$$

Note that the FLGA waypoint may be collocated with the FLOG waypoint.

Base (BASE)

The BASE waypoint defines the leg that intercepts the FLGA leg at an angle that is typically 90 degrees in the xy plane, but for the sake of generality, it can be assumed that it is at an angle $\alpha_{BASE}$. A 0 degree angle means that the base leg is aligned with its next leg (an extension of it). A 90 degree angle is perpendicular to the next leg and a 180 degree angle is aligned with the next leg, but in the opposite direction (making a U turn at FLGA waypoint). Values for $\alpha_{BASE}$ may be between 45 and 90 degrees. In the following, it can be assumed the problem is symmetrical, such that 90 degrees can be either to the left or to the right of the runway (hence the absolute value of y). The side (i.e., the sign of y) will be determined by other constraints.

The BASE's next leg is the FLOG leg. The purpose of the BASE leg is to reach the runway alignment at a safe altitude. The aircraft is permitted to lose altitude on the base leg.

The BASE waypoint x coordinate is defined by $$x = x_{next} - \text{sign}(90 - \alpha_{BASE}) * \tan \alpha_{BASE} * y$$

The BASE waypoint may be at between $W_{BASE}^{min}$ meters and $W_{BASE}^{max}$ meters laterally from the runway $$W_{BASE}^{min} \leq |y| \leq W_{BASE}^{max}$$

The BASE waypoint may be no lower than the next waypoint $$z \geq z_{next}$$

The slope between the BASE waypoint and the next waypoint may be no greater than $\gamma_{BASE}$ degrees:

$$z \leq z_{next} + \frac{|y|}{\cos \alpha_{BASE} * \tan \gamma_{BASE}}$$

Initial Descent (INIT) Leg

The initial descent leg is parallel to the runway. Its next leg is the BASE leg. On the initial descent, the aircraft transitions from the cruise configuration to the landing configuration (starts deploying flaps and losing altitude).

The INIT waypoint direction is towards the negative x-axis:

$$x \geq x_{next}$$

The INIT leg is parallel to the runway and on the same side as the next waypoint:

$$y = y_{next}$$

The slope between the INIT waypoint and the next waypoint may be no greater than $\gamma_{INIT}$ degrees:

$$z \leq z_{next} + (x - x_{next}) * \tan \gamma_{INIT}$$

Downwind (DWND)

The downwind leg is parallel to the runway and may be at constant altitude. It is typically at the "pattern altitude." Its next leg is the initial descent leg.

The DWND waypoint direction is towards the negative x-axis:

$$x \geq x_{next}$$

The DWND waypoint is parallel to the runway and on the same side as the next waypoint:

$$y = y_{next}$$

The DWND waypoint may be between $AGL_{DWND}^{min}$ and $AGL_{DWND}^{max}$ meters above the runway:

$$AGL_{DWND}^{min} \leq z \leq AGL_{DWND}^{max}$$

Approach (APPR)

The approach leg allows the aircraft to enter the traffic pattern at a typical 45 degree angle to the downwind. For the sake of generality, $\alpha_{APPR}$ can be used as the angle between the APPR leg and the DWND leg. Ninety degrees is perpendicular to the DWND leg and 0 degrees is aligned with and in the same direction as the DWND leg. Example typical values are between 30 and 60 degrees, with 45 being an example preferred value for pilots flying VFR approaches. This approach angle, $\alpha_{APPR}$, is a free variable that the optimizer can set.

The APPR leg direction is along the negative x-axis:

$$x \geq x_{next}$$

The APPR leg direction is towards the runway:

$$|y| \geq |y_{next}|$$

The APPR waypoint is on the same side of the runway as the next waypoint:

$$y * y_{next} \geq 0$$

The angle in the xy plane between the APPR leg and the next leg is $\alpha_{APPR}$ degrees:

$$(x - x_{next}) \tan \alpha_{APRR} = |y| - |y_{next}|$$

The slope of the approach leg may be no greater than $\gamma_{APPR}$:

$$z - z_{next} < (x - x_{next})/\cos \alpha_{APPR}/\tan \gamma_{APPR}$$

The APPR waypoint may not be below the next waypoint:

$$z \geq z_{next}$$

Note that the following constraints on the parameters may be satisfied for the problem to be feasible: $-\alpha_{APPR} < 90$ Crosswind (XWND)

The crosswind leg is typically perpendicular to the runway and is used when the aircraft is either departing the airport or performing what is called "pattern work," meaning that the aircraft remains in the traffic pattern around the airport. During the crosswind leg, the aircraft climbs until reaching the pattern altitude. For the sake of generality, it can be assumed that the XWND leg is at an angle $\alpha_{XWND}$ with the runway. The angle $\alpha_{XWND}$ is typically 90 deg. A 0 degree angle results in the XWND leg being aligned and in the same direction (positive x-axis) as the runway. A 180 degree angle results in the XWND leg being in the opposite direction of the runway. A 90 degree angle results in the XWND leg being perpendicular to the runway, to its left or to its right. A typical value may be between 70 and 110 degrees. Its next leg is the DWND leg.

The XWND leg is at an angle $\alpha_{XWND}$ with the runway, meaning that it is at an angle $(180 - \alpha_{XWND})$ degrees with its next leg:

$$x - x_{next} = (|y| - |y_{next}|)/\tan(180 - \alpha_{XWND})$$

The XWND waypoint is aligned with the runway:

$$y = 0$$

The XWND waypoint may be between $L_{UPWD}^{min}$ and $L_{UPWD}^{max}$ meters from the runway $$L_{UPWD}^{min} \leq x \leq L_{UPWD}^{max}$$

The slope of the XWND leg may not be greater than $\gamma_{XWND}$ degrees:

$$z_{next} - z < (|y| - |y_{next}|)/\sin \alpha_{XWND} * \tan \gamma_{XWND}$$

Note that the following constraints on the parameters may be satisfied for the problem to be feasible:

$$0 < \alpha_{XWND} < 180$$

$$L_{UPWD}^{min} \le L_{UPWD}^{max}$$

An optional feature of the example algorithm is the ability to modify the path and/or the ground speed of each leg to ensure that the aircraft will pass at each waypoint at a given required time of arrival (RTA). Meeting the RTA for each waypoint may constrain the ground speed of the aircraft. It is assumed that the flight control system is able to track ground speed accurately (within limits) in order to meet time of arrivals.

The generated path may avoid obstacles that are typically represented by 3D polyhedrons, sphere, or cylinders. Each obstacle may also have an optional validity period in which the obstacle should be avoided during the "active" time interval.

Two example methods may be used to constrain the path planning optimizer to generate a path that does not intersect obstacles. One example method to check that the path is conflict free is to add points along the legs using a linear interpolation and add constraints to the problem: the new points may be outside of the polyhedron. Another approach is to use an algorithm to detect a line intersecting a convex 3D polyhedral.

The algorithm may accommodate constraints for terrain avoidance. In one example, the generated waypoints may be constrained in order to avoid the terrain. For example, the entire trajectory between the waypoints may be constrained so as to avoid the terrain. In order to ensure that the entire trajectory avoids terrain and obstacles, the algorithm may generate new points (referred to as "control points") along the trajectory. The control points may be located in between the waypoints. The control points may be a linear interpolation of the waypoints. The terrain may be modeled by a series of convex polyhedra. In some implementations, a buffer zone may be added around the polyhedra to ensure a minimum distance between the trajectory and the terrain. Each terrain polyhedra may be defined by its bounding box $(X_{terr}^{min}, X_{terr}^{max}, T_{terr}^{min}, Y_{terr}^{max}, 0, Z_{terr}^{max})$. Then, for each waypoint and for each control point, the altitude constraint may be:

$$z > Z_{terr}^{max}$$

If $X_{terr}^{min} < x < X_{terr}^{max}$ and $Y_{terr}^{min} < y < Y_{terr}^{max}$ Obstacles and weather may be modeled similarly to terrain. In the case of obstacles, weather, and restricted airspaces, the polyhedra have a non-zero minimum altitude, which allows for the trajectory to be generated below the obstacle. The polyhedra may be defined by $(X_{obs}^{min}, X_{obs}^{max}, Y_{obs}^{min}, Y_{obs}^{max}, Z_{obs}^{min}, Z_{obs}^{max})$.

The altitude constraints may be:

$$z > Z_{obs}^{max} \text{ or } z < Z_{obs}^{min}$$

If $X_{obs}^{min} < x < X_{obs}^{max}$ and $Y_{obs}^{min} < y < Y_{obs}^{max}$

With constraints defined, the objective function that will be minimized can be generated. This minimization process may drive the path towards the preferred path while satisfying the constraints:

Maximize altitude of final leg: $-\beta_{BASE}^{z} * z_{BASE}$, $\beta_{BASE}^{z} > 0$, where $\beta$ is a weighting value.
Maximize altitude of base leg: $-\beta_{BASE}^{z} * z_{BASE}$, $\beta_{BASE}^{z} > 0$
Minimize the distance from the preferred pattern width $W_{BASE}^{preferred}$ $$\beta_{BASE}^{W_{preferred}} * ||Y_{BASE}| = W_{BASE}^{preferred}|$$

$$\min J = -\beta_{FLGA}^{z} * z_{FLGA} - \beta_{BASE}^{z} * z_{BASE} + \beta_{BASE}^{W_{preferred}} ||Y_{BASE}| - |W_{BASE}^{preferred}||$$

The pattern planner module 654 can adapt the width of the pattern to accommodate for surrounding traffic or external preferences. This adaptation can be reflected in either the constraints or in the objective function. For instance, if the aircraft should follow another aircraft that is already in the pattern and flying at the given lateral distance from the runway, the parameter $W_{BASE}^{preferred}$ may be set to that distance. The degree of necessity of tracking this lateral distance precisely may be determined by varying $\beta_{BASE}^{W_{preferred}}$ in the objective function.

A departure pattern (e.g., a takeoff pattern) may use similar pattern planning as described with respect to the landing pattern above. In the departure case, the entry point into a waypoint sequence data structure (e.g., see FIG. 12A) may be determined by the first waypoint of the navigation flight path (denoted NAV WPT 1). The runway used for takeoff may be determined by the runway selector module 650-1 or can be manually set by ATC 104. The sequence of legs to be followed may be computed based on the runway selected, NAV WPT 1, and the waypoint sequence data structure illustrated in FIG. 12A.

Figure 12B:
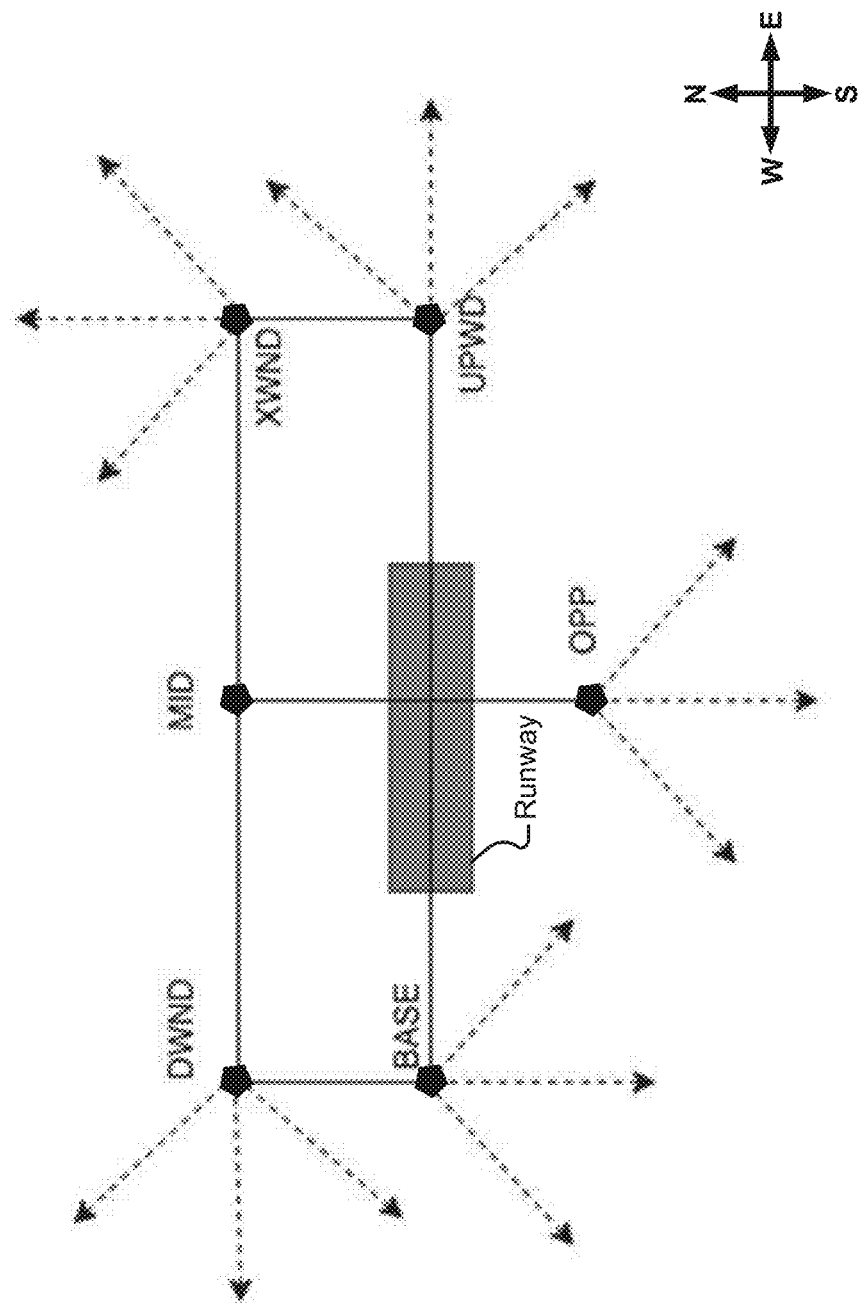
FIG. 12B illustrates an example takeoff pattern.

FIG. 12B illustrates an example departure pattern. The broken lines in FIG. 12B illustrate waypoints at which the aircraft may exit the vicinity of the airport. The takeoff direction in FIG. 12B is in the eastern direction. The midpoint waypoint (MID) may be used when crossing the runway to exit the vicinity of the airport at the OPP waypoint.

When generating constraints for departing, the constraints may be built based on the previous leg instead of the next leg in the landing case. The coordinates of the preceding waypoint are denoted $(x_{prec}, y_{prec}, z_{prec})$. The following description and equations show an example implementation of constraints for departing an airport.

Upwind (UPWD) Leg for Departure

The "base" of the tree may be the upwind leg, or departure leg, defined by the beginning of the runway on one end, and the XWND waypoint on the other end. The UPWD waypoint is aligned with the runway. During this initial leg, the aircraft may climb and remain aligned with the runway until sufficient altitude has been reached to safely initiate a turn.

The UPWD waypoint is aligned with the runway:

$$y = 0$$

The UPWD length, defined by x location of the UPWD waypoint, may be between $L = L_{UPWD}^{min}$ and $L_{UPWD}^{max}$ meters:

$$L_{UPWD}^{min} \le x \le L_{UPWD}^{max}$$

The aircraft may reach a safe altitude $Z_{maneuver}$ before initiating a turn or starting its navigation:

$$z > Z_{maneuver}$$

Crosswind (XWND) for Departure

On the crosswind leg, the aircraft may keep on climbing until reaching the pattern altitude or the maximum altitude authorized by ATC 104. For the sake of generality, it may be assumed that the XWND leg is at an angle $\alpha_{XWND}$ with the runway. The angle $\alpha_{XWND}$ is typically 90 deg. A 0 degree angle results in the XWND leg being aligned and in the same direction (positive x-axis) as the runway. A 180 degree angle results in the XWND leg being in the opposite direction of the runway. A 90 degree angle results in the XWND leg being perpendicular to the runway, to its left or its right. A typical value may be between 70 and 110 degrees. Its preceding leg is the DWND leg.

The XWND leg is at an angle $\alpha_{XWND}$ with the runway and its preceding leg (the UPWD leg):

$$x - x_{prec} = (|y| - |y_{prec}|)/\tan(\alpha_{XWND})$$

The XWND waypoint may be between $W_{XWND}^{min}$ meters and $W_{XWND}^{max}$ meters laterally from the runway:

$$W_{XWND}^{min} \leq |y| \leq W_{XWND}^{max}$$

The aircraft may reach a minimum altitude $Z_{XWND}^{min}$ before transitioning to the next waypoint. This desired altitude may be the pattern altitude:

$$z \geq Z_{XWND}^{min}$$

Components of the aircraft 100 illustrated herein (e.g., see FIGS. 6A-6B), such as the systems, modules, and data may represent features included in the aircraft 100. The systems, modules, and data described herein may be embodied by various aircraft avionics, including electronic hardware, software, firmware, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. For example, the memory components may include the data included in the AFMS data 658. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic hardware and software that provides communication with a variety of different devices. For example, the I/O components may provide communication between other devices and the one or more processing units and memory components.

What is claimed is:

1. A system comprising:
   a runway selector module configured to select a landing waypoint on a runway for a first aircraft based on traffic classification data that indicated the location and direction of one or more additional aircraft;
   a leg sequencer module configured to:
      compute a location and a heading of the first aircraft relative to the runway;
      select a starting waypoint based on the location of the first aircraft relative to the runway and the heading of the first aircraft relative to the runway; and
      select additional waypoints between the starting waypoint and the landing waypoint, wherein the starting waypoint and the additional waypoints each include a latitude variable, a longitude variable, and an altitude variable, and wherein a sequence of waypoints from the starting waypoint to the landing waypoint via the additional waypoints indicates a desired location for the first aircraft to traverse prior to landing on the runway at the landing waypoint; and
   a pattern planner module configured to:
      compute a landing pattern data structure that includes latitude values, longitude values, and altitude values for each of the latitude variables, longitude variables, and altitude variables associated with the starting waypoint and the additional waypoints;
      update the landing pattern data structure in response to detection of an aircraft on the runway; and
      output the landing pattern data structure to a flight control system of the first aircraft, wherein the landing pattern data structure includes the starting waypoint, the additional waypoints, the landing waypoint, and the corresponding latitude values, longitude values, and altitude values.

2. The system of claim 1, further comprising a traffic classifier module configured to generate the traffic classification data based on at least one of radar data, camera data, and light detection and ranging (Lidar) data.

3. The system of claim 1, further comprising a traffic classifier module configured to generate the traffic classification data based on data received from the one or more additional aircraft.

4. The system of claim 1, further comprising a traffic classifier module configured to generate the traffic classification data based on data received from a ground communication system.

5. The system of claim 1, wherein selecting the landing waypoint on the runway comprises identifying a set of one or more active runways based on the traffic classification data, and wherein the set of one or more active runways includes the runway.

6. The system of claim 1, wherein selecting the landing waypoint on the runway comprises computing, based on the traffic classification data, that the runway is currently in use by one or more of the additional aircraft for at least one of landing and departure.

7. The system of claim 1, wherein the leg sequencer module is configured to select the starting waypoint based on the traffic classification data.

8. The system of claim 1, wherein the pattern planner module is configured to generate the landing pattern data structure based on the traffic classification data.

9. The system of claim 1, wherein the pattern planner module is configured to update the landing pattern data structure in response to detection of a new aircraft that is not included in the one or more additional aircraft.

10. The system of claim 1, further comprising a traffic classifier module configured to:
compute an additional landing traffic pattern associated with one or more of the additional aircraft; and
compute a leg of the additional landing traffic pattern that includes one or more of the additional aircraft, wherein the pattern planner module is configured to generate the landing pattern data structure based on the leg of the additional landing traffic pattern that includes one or more of the additional aircraft.

11. The system of claim 1, further comprising a traffic classifier module configured to:
compute an additional landing traffic pattern associated with one or more of the additional aircraft; and
compute whether the additional landing traffic pattern is a right traffic pattern or a left traffic pattern, wherein the pattern planner module is configured to generate the landing pattern data structure based on whether the additional landing traffic pattern is a right traffic pattern or a left traffic pattern.

12. The system of claim 1, further comprising a traffic classifier module configured to compute an estimated time of arrival for one or more of the additional aircraft, wherein the pattern planner module is configured to generate the landing pattern data structure based on the estimated time of arrival.

13. The system of claim 1, wherein the pattern planner module is configured to generate the landing pattern data structure based on one or more distance constraints that define one or more corresponding distances between the first aircraft and the one or more additional aircraft.

14. A method comprising:
selecting a landing waypoint on a runway for a first aircraft based on traffic classification data that indicates the location and direction of one or more additional aircraft;
computing a location and a heading of the first aircraft relative to the runway;
selecting a starting waypoint based on the location of the first aircraft relative to the runway and the heading of the first aircraft relative to the runway;
selecting additional waypoints between the starting waypoint and the landing waypoint, wherein the starting waypoint and the additional waypoints each include a latitude variable, a longitude variable, and an altitude variable, and wherein a sequence of waypoints from the starting waypoint to the landing waypoint via the additional waypoints indicates a desired location for the first aircraft to traverse prior to landing on the runway at the landing waypoint;
computing a landing pattern data structure that includes the latitude values, longitude values, and altitude values for each of the latitude variables, longitude variables, and altitude variables associated with the starting waypoint and the additional waypoints;
updating the landing pattern data structure in response to detection of an aircraft on the runway; and
outputting the landing pattern data structure to a flight control system of the first aircraft, wherein the landing pattern data structure includes the starting waypoint, the additional waypoints, the landing waypoint, and the corresponding latitude values, longitude values, and altitude values.

15. The method of claim 14, further comprising generating the traffic classification data based on at least one of radar data, camera data, and light detection and ranging (Lidar) data.

16. The method of claim 14, further comprising generating the traffic classification data based on data received from the one or more additional aircraft.

17. The method of claim 14, further comprising generating the traffic classification data based on data received from a ground communication system.

18. The method of claim 14, wherein selecting the landing waypoint on the runway comprises identifying a set of one or more active runways based on the traffic classification data, and wherein the set of one or more active runways includes the runway.

19. The method of claim 14, wherein selecting the landing waypoint on the runway comprises computing, based on the traffic classification data, that the runway is currently in use by one or more of the additional aircraft for at least one of landing and departure.

20. The method of claim 14, further comprising selecting the starting waypoint based on the traffic classification data.

21. The method of claim 14, further comprising generating the landing pattern data structure based on the traffic classification data.

22. The method of claim 14, further comprising updating the landing pattern data structure in response to detection of a new aircraft that is not included in the one or more additional aircraft.

23. The method of claim 14, further comprising:
computing an additional landing traffic pattern associated with one or more of the additional aircraft;
computing a leg of the additional landing traffic pattern that includes one or more of the additional aircraft; and
generating the landing pattern data structure based on the leg of the additional landing traffic pattern that includes one or more of the additional aircraft.

24. The method of claim 14, further comprising:
computing an additional landing traffic pattern associated with one or more of the additional aircraft;
computing whether the additional landing traffic pattern is a right traffic pattern or a left traffic pattern; and
generating the landing pattern data structure based on whether the additional landing traffic pattern is a right traffic pattern or a left traffic pattern.

25. The method of claim 14, further comprising:
computing an estimated time of arrival for one or more of the additional aircraft; and
generating the landing pattern data structure based on the estimated time of arrival.

26. The method of claim 14, further comprising generating the landing pattern data structure based on one or more distance constraints that define one or more corresponding distances between the first aircraft and the one or more additional aircraft.

* * * * *